United States Patent
Yasuie et al.

(10) Patent No.: US 8,355,330 B2
(45) Date of Patent: Jan. 15, 2013

(54) BAND MEASUREMENT METHOD AND STORAGE MEDIUM

(75) Inventors: Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 474 days.

(21) Appl. No.: 12/632,022

(22) Filed: Dec. 7, 2009

(65) Prior Publication Data

US 2010/0142395 A1    Jun. 10, 2010

(30) Foreign Application Priority Data

Dec. 9, 2008    (JP) ................................. 2008-313746

(51) Int. Cl.
    *H04L 12/26*      (2006.01)
(52) U.S. Cl. ........................................................ 370/241
(58) Field of Classification Search .................. 370/241, 370/248–253, 464; 709/223, 224
See application file for complete search history.

(56) References Cited

U.S. PATENT DOCUMENTS

| | | | | |
|---|---|---|---|---|
| 6,711,137 | B1 * | 3/2004 | Klassen et al. ................ | 370/252 |
| 6,757,255 | B1 * | 6/2004 | Aoki et al. ..................... | 370/252 |
| 6,885,641 | B1 * | 4/2005 | Chan et al. ..................... | 370/252 |
| 7,116,639 | B1 * | 10/2006 | Gail et al. ...................... | 370/252 |
| 7,573,886 | B1 * | 8/2009 | Ono ............................ | 370/395.2 |
| 7,633,869 | B1 * | 12/2009 | Morris et al. .................. | 370/232 |
| 2002/0133614 | A1 * | 9/2002 | Weerahandi et al. ......... | 709/237 |
| 2005/0232227 | A1 * | 10/2005 | Jorgenson et al. ............ | 370/351 |

FOREIGN PATENT DOCUMENTS

JP     2002-217965     8/2002

* cited by examiner

*Primary Examiner* — Dmitry H Levitan
(74) *Attorney, Agent, or Firm* — Katten Muchin Rosenman LLP

(57) ABSTRACT

A band measurement method for measuring a band available for communication with a target device connected via a network includes: transmitting a first request having a first data size and requesting a response having a fixed size to the target device via the network; determining a first time between the transmitting of the first request and the receipt of the response upon receipt of the response; transmitting a second request having a second data size and requesting a response having the fixed size to the target device via the network; determining a second time between transmitting of the second request and the receipt of the response upon receipt of the response; and calculating a first communication band available for transmitting data to the target device by dividing the difference between the first and second data sizes by the difference between the first and second times.

10 Claims, 21 Drawing Sheets

BAND MEASUREMENT METHOD AND STORAGE MEDIUM

This application is based upon and claims the benefit of priority from the prior Japanese Patent Application No. 2008-313746 filed on Dec. 9, 2008, the entire contents of which are incorporated herein by reference.

BACKGROUND

1. Field

The embodiments discussed herein are related to a technique for measuring a communication bandwidth available between devices.

2. Description of Related Art

With the diversification and complication of a network, a technique for accurately recognizing the network state is required. Examples of the network state include an available communication bandwidth. In a general technique that has been implemented so far, dedicated agents are required to be installed one for each in a measuring device and a measurement target device for measuring the communication bandwidth separately by the uplink and the downlink and perform time synchronization before performing measurement, which is not only time-consuming but also cannot measure at an arbitrary timing.

Alternatively, there is a technique by which only the measuring device is used to measure the communication bandwidth with the measurement target device. For example, packets differing in length between a local IP device and a remote IP device are transmitted, and the length and the response time of the transmitted packet are used to measure the communication bandwidth between the IP devices without differentiating the uplink and the downlink (see Japanese Laid-Open Patent publication No. 2002-217965). However, when the line segment is asymmetrical between the uplink and the downlink, such as an asymmetric digital subscriber line (ADSL), the uplink and the downlink are to be differentiated.

SUMMARY

According to an embodiment, a band measurement method for measuring a band available for communication with a target device connected via a network includes: transmitting a first request having a first data size and requesting a response having a fixed size to the target device via the network; determining a first time between the transmitting of the first request and the receipt of the response upon receipt of the response; transmitting a second request having a second data size and requesting a response having the fixed size to the target device via the network; determining a second time between transmitting of the second request and the receipt of the response upon receipt of the response; and calculating a first communication band available for transmitting data to the target device by dividing the difference between the first and second data size by the difference between the first and second time.

It is to be understood that both the foregoing summary description and the following detailed description are explanatory as to some embodiments of the present invention, and not restrictive of the present invention as claimed.

DESCRIPTION OF EXAMPLE EMBODIMENTS

Figure 1:
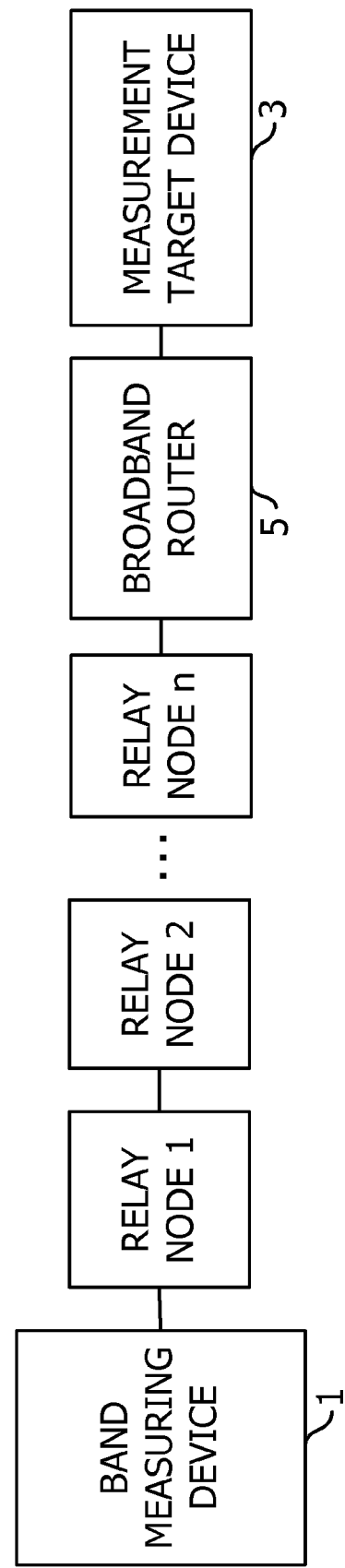
FIG. 1 illustrates an outline of a system in accordance with an embodiment of the present technique.

FIG. 1 illustrates an outline in accordance with an embodiment of the present technique. A band measuring device 1 and a measurement target device 3 which execute major processes of the present embodiment are connected to each other via relay nodes 1 to n such as routers and links connecting these nodes. The relay nodes 1 to n may be a broadband router 5 such as ADSL. An example of the measurement target device 3 is a personal computer having normal functions required for connecting to the Internet. More specifically, the measurement target device 3 has a function capable of communicating with the Internet protocol and other higher-level protocols. The measurement target device 3 does not necessarily need to have a special program installed therein, but may need to be set so as to respond to a request from the band measuring device 1 as described later.

Figure 2:
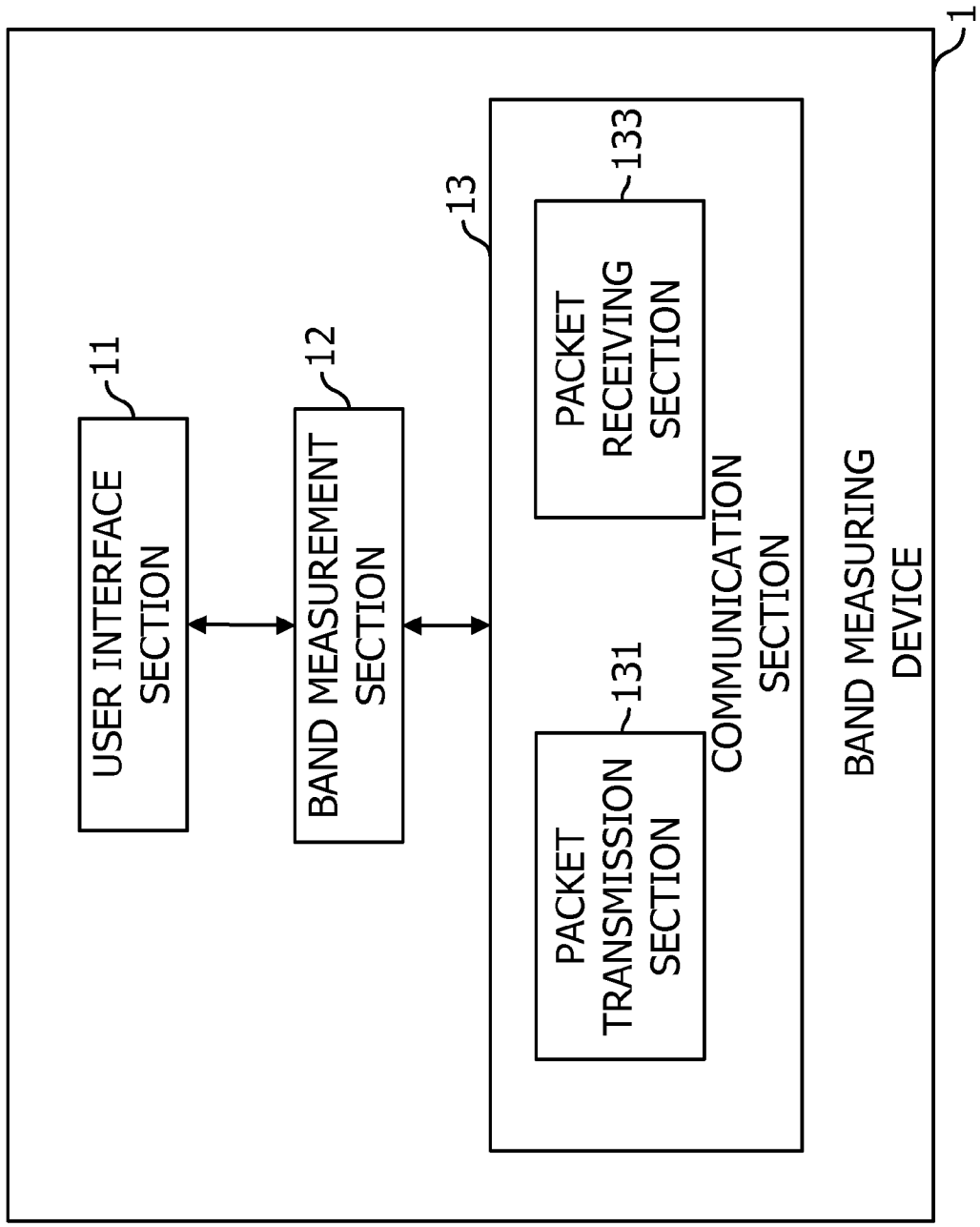
FIG. 2 is a functional block diagram of a band measuring device.
Figure 3:
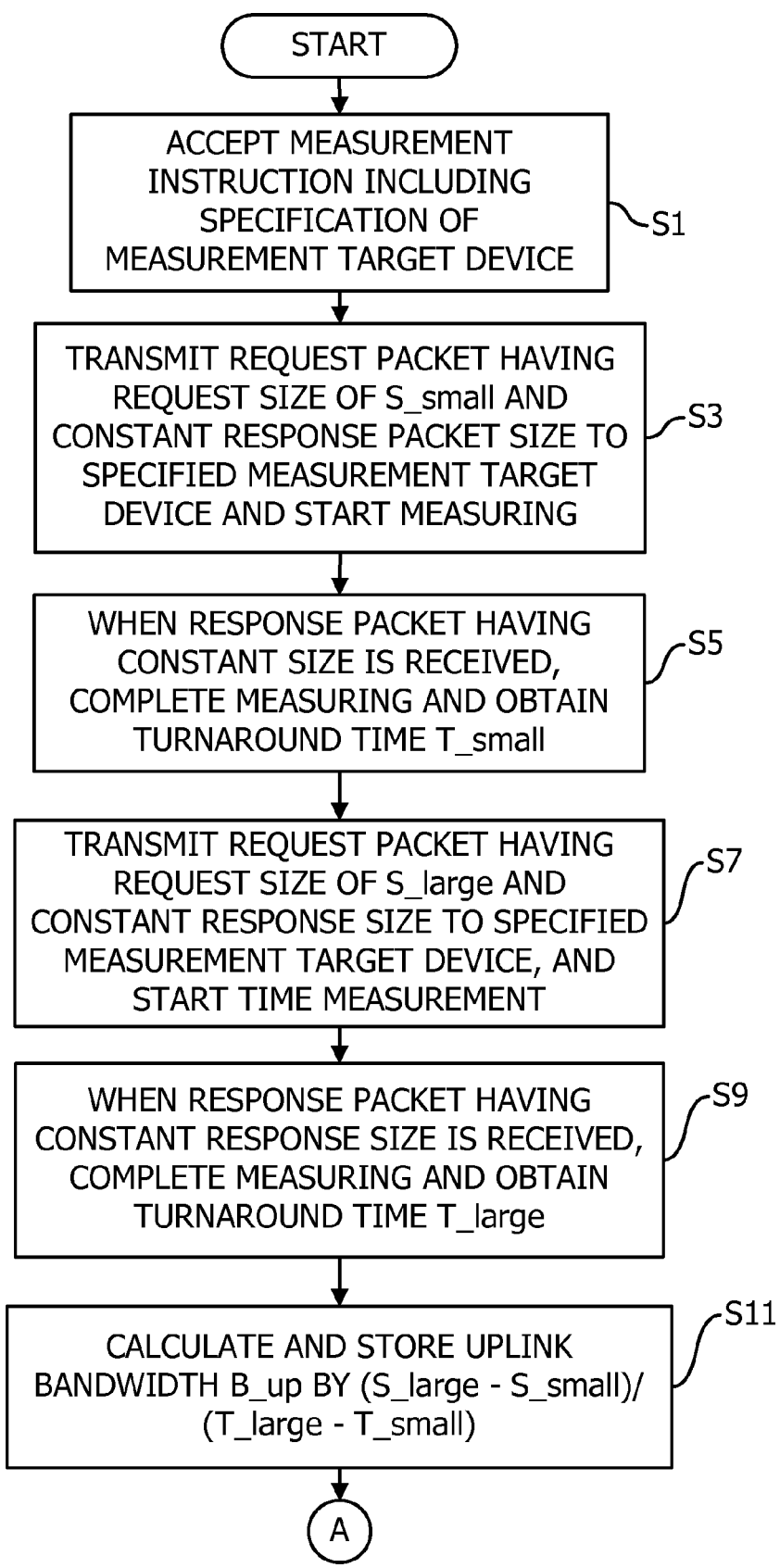
FIG. 3 is a flowchart of a process in accordance with the embodiment of the present technique.

FIG. 2 is a functional block diagram of the band measuring device 1. The band measuring device 1 includes a user interface section 11 for receiving an instruction from a user and presenting the user with a measurement result and the like; a band measurement section 12 which in response to an instruction from the user interface section 11, performs band measurement as described later and outputs the band measurement result to the user interface section 11; and a communication section 13 which in response to an instruction from the band measurement section 12, transmits a packet to the measurement target device 3, and when a packet is received from the measurement target device 3, informs the band measurement section 12 of the receipt of the packet. The communication section 13 has a packet transmission section 131 and a packet receiving section 133.

Now, by referring to FIGS. 3 to 8, the operation of the device illustrated in FIGS. 1 and 2 will be described. First, the user interface section 11 of the band measuring device 1 prompts the user to specify the measurement target device 3 and instruct measurement. When the user specifies the measurement target device 3 (e.g., IP address, etc.) and instructs the measurement, the user interface section 11 accepts the specification of the measurement target device 3 and the measurement instruction and outputs the measurement instruction including the specification of the measurement target device 3, to the band measurement section 12 (FIG. 3: Step S1). When the measurement instruction including the specification of the measurement target device 3 is received from the user interface section 11, the band measurement section 12 instructs the packet transmission section 131 of the communication section 13 to transmit a request packet having a request size of S_small and requesting a response packet having a constant response size to be returned, to the specified measurement target device 3. In response to the instruction from the band measurement section 12, the packet transmission section 131 transmits a request packet having a request size of S_small and requesting a response packet having a constant response size to be returned, to the specified measurement target device 3 and the band measurement section 12 starts time measurement (Step S3).

As the request packet having the request size of S_small and requesting a response packet having a constant response size to be returned, a user datagram protocol (UDP) packet to a high port (an unused port having a port number of 1024 or higher) of the measurement target device 3 can be used. In response to such a UDP packet, the measurement target device 3 returns an unreachable response (ICMP Destination Port Unreachable) packet. The size of the unreachable response packet is constant if the size of the request UDP packet is a predetermined size or greater. It should be noted that the packet is not limited to this, but other kinds of packets may be used as long as the above functions can be achieved.

The request packet passes through the relay nodes 1 to n and the links connecting to these nodes and reaches the measurement target device 3. In response to the request packet, the measurement target device 3 returns a response packet having a constant response size to the band measuring device 1 which transmitted the request packet. It should be noted that n of the relay nodes 1 to n may be any number. In addition, any device and any link may be used. Further, in FIG. 1, the uplink from the band measuring device 1 to the measurement target device 3 is the same as the downlink from the measurement target device 3 to the band measuring device 1, but the present embodiment may include a case where the uplink is different from the downlink.

When a response packet having a constant size is transmitted from the measurement target device 3, and the response packet reaches the band measuring device 1 as described above, the packet receiving section 133 of the communication section 13 receives the response packet and notifies the band measurement section 12 of the receipt of the response packet. Then, the band measurement section 12 completes the time measurement which started at Step S3, obtains a turnaround time T_small from when the measurement started to when the measurement completed, and stores the time in a storage device such as a main memory (Step S5).

Figure 4:
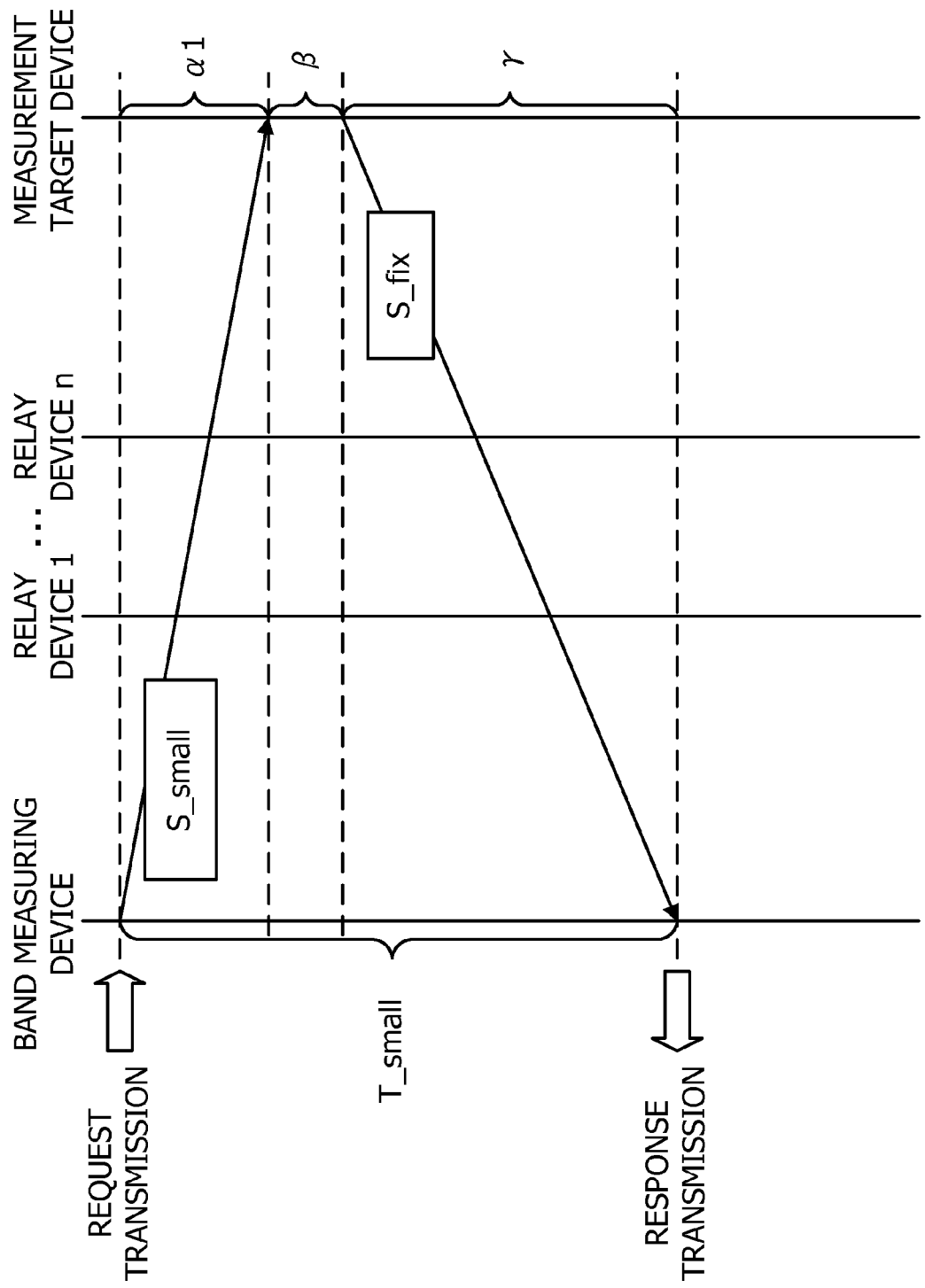
FIG. 4 illustrates an outline of a first measurement of an uplink communication bandwidth.

FIG. 4 illustrates a schematic view of Steps S3 and S5. First, a request packet having a size of S_small is transmitted from the band measuring device 1 to the measurement target device 3. It takes time $\alpha 1$ corresponding to the uplink communication bandwidth. Then, the measurement target device 3 performs a process required for transmitting a response packet. It takes time $\beta$. Then, a response packet having a constant size of S_fix is transmitted from the measurement target device 3 to the band measuring device 1. It takes time $\gamma$ corresponding to the downlink communication bandwidth. Thus, the turnaround time T_small measured in this manner is expressed by $T\_small = \alpha 1 + \beta + \gamma$.

Referring back to FIG. 3, next, the band measurement section 12 instructs the packet transmission section 131 of the communication section 13 to transmit a request packet having a request size of S_large and requesting a response packet having a constant response size to be returned, to the specified measurement target device 3. In response to an instruction from the band measurement section 12, the packet transmission section 131 transmits a request packet having a request size of S_large and requesting a response packet having a constant response size to be returned, to the specified measurement target device 3, and the band measurement section 12 starts time measurement (Step S7).

The request packet passes through the relay nodes 1 to n and the links connecting to these nodes and reaches the measurement target device 3. Then, in response to the request packet, the measurement target device 3 returns a response packet having a constant response size, to the band measuring device 1 which transmitted the request packet.

When a response packet having a constant size is transmitted from the measurement target device 3, and the response packet reaches the band measuring device 1 as described above, the packet receiving section 133 of the communication section 13 receives the response packet and notifies the band measurement section 12 of the receipt of the response packet. Then, the band measurement section 12 completes the time measurement which started at Step S7, obtains a turnaround time T_large from when the measurement started to when the measurement completed, and stores the time in a storage device such as a main memory (Step S9).

Figure 5:
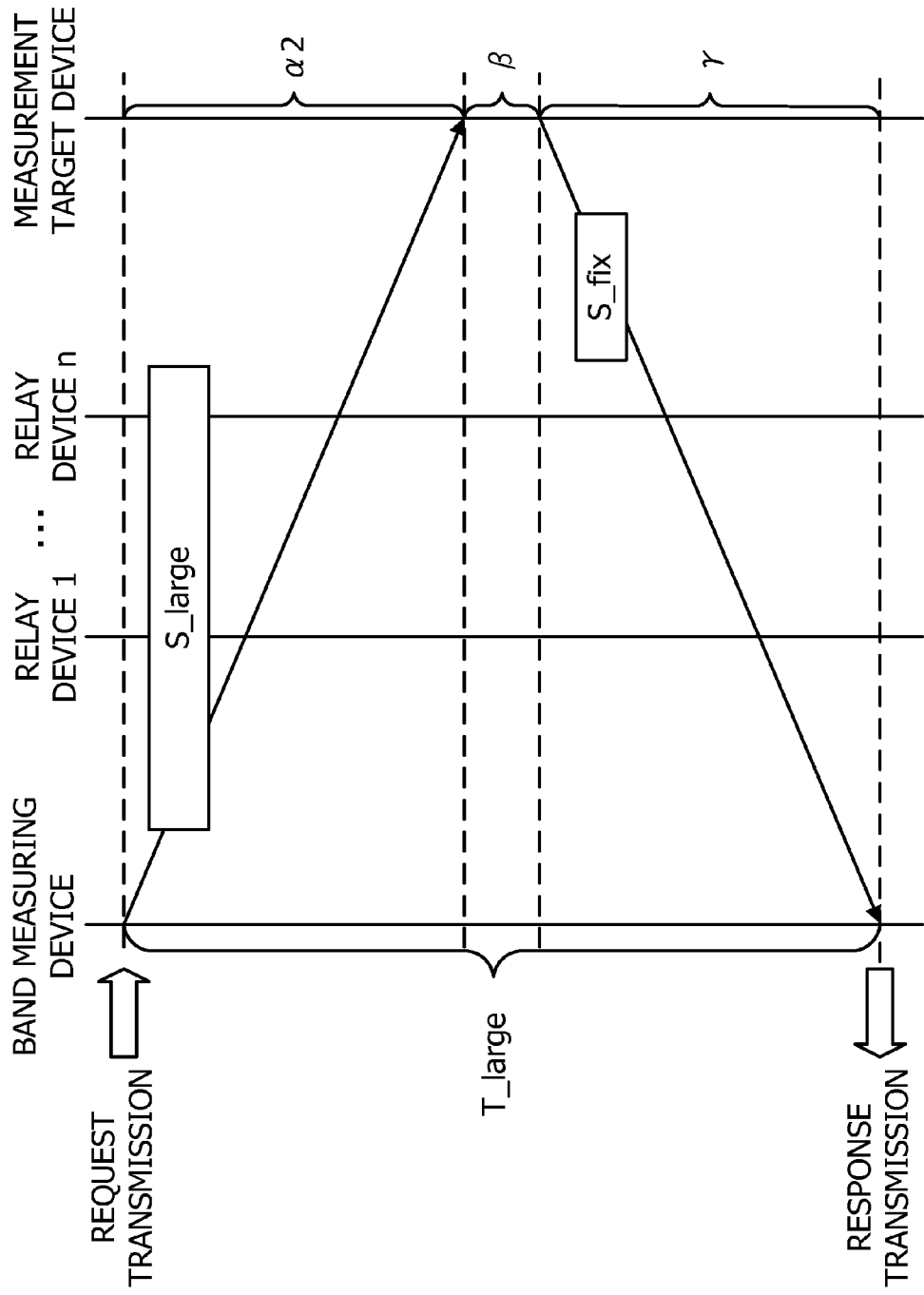
FIG. 5 illustrates an outline of a second measurement of the uplink communication bandwidth.

FIG. 5 illustrates a schematic view of Steps S7 and S9. First, a request packet having a size of S_large is transmitted from the band measuring device 1 to the measurement target device 3. It takes time $\alpha 2$ corresponding to the uplink communication bandwidth. Normally, $\alpha 1 < \alpha 2$. Then, the measurement target device 3 performs a process required for transmitting a response packet. It takes time $\beta$. Then, a response packet having a constant size of S_fix is transmitted from the measurement target device 3 to the band measuring device 1. It takes time $\gamma$ corresponding to the downlink communication bandwidth. Thus, the turnaround time T_large measured in this manner is expressed by $T\_large = \alpha 2 + \beta + \gamma$.

As described above, the downlink communication time $\gamma$ and the processing time $\beta$ of the measurement target device 3 are the same for the time of the first measurement (FIG. 4) and the time of the second measurement (FIG. 5) respectively. That is, $T\_large - T\_small = \alpha 2 + \beta + \beta - (\alpha 1 + \beta + \gamma) = \alpha 2 - \alpha 1$. Here, assuming the difference in size of the request packets and the uplink communication bandwidth B_up, $\alpha 2 - \alpha 1$ also includes a relation: $\alpha 2 - \alpha 1 = (S\_large - S\_small)/B\_up$.

Accordingly, assigning $\alpha 2-\alpha 1=T\_large-T\_small$, B_up can be expressed as follows.

$$B\_up=(S\_large-S\_small)/(T\_large-T\_small) \quad (1)$$

It should be noted that the values of S and T are all positive and have the same increase/decrease tendency. Thus, the order may be changes such as $(S\_small-S\_large)/(T\_small-T\_large)$. Further, T_large may be measured first.

The band measurement section 12 calculates the uplink bandwidth B_up by $(S\_large-S\_small)/(T\_large-T\_small)$, and stores the result in a storage device such as a main memory (Step S11). At this stage, the uplink bandwidth B_up which is a measurement result may be presented to the user via the user interface section 11. The process moves to the process of FIG. 6 via a terminal A.

Figure 6:
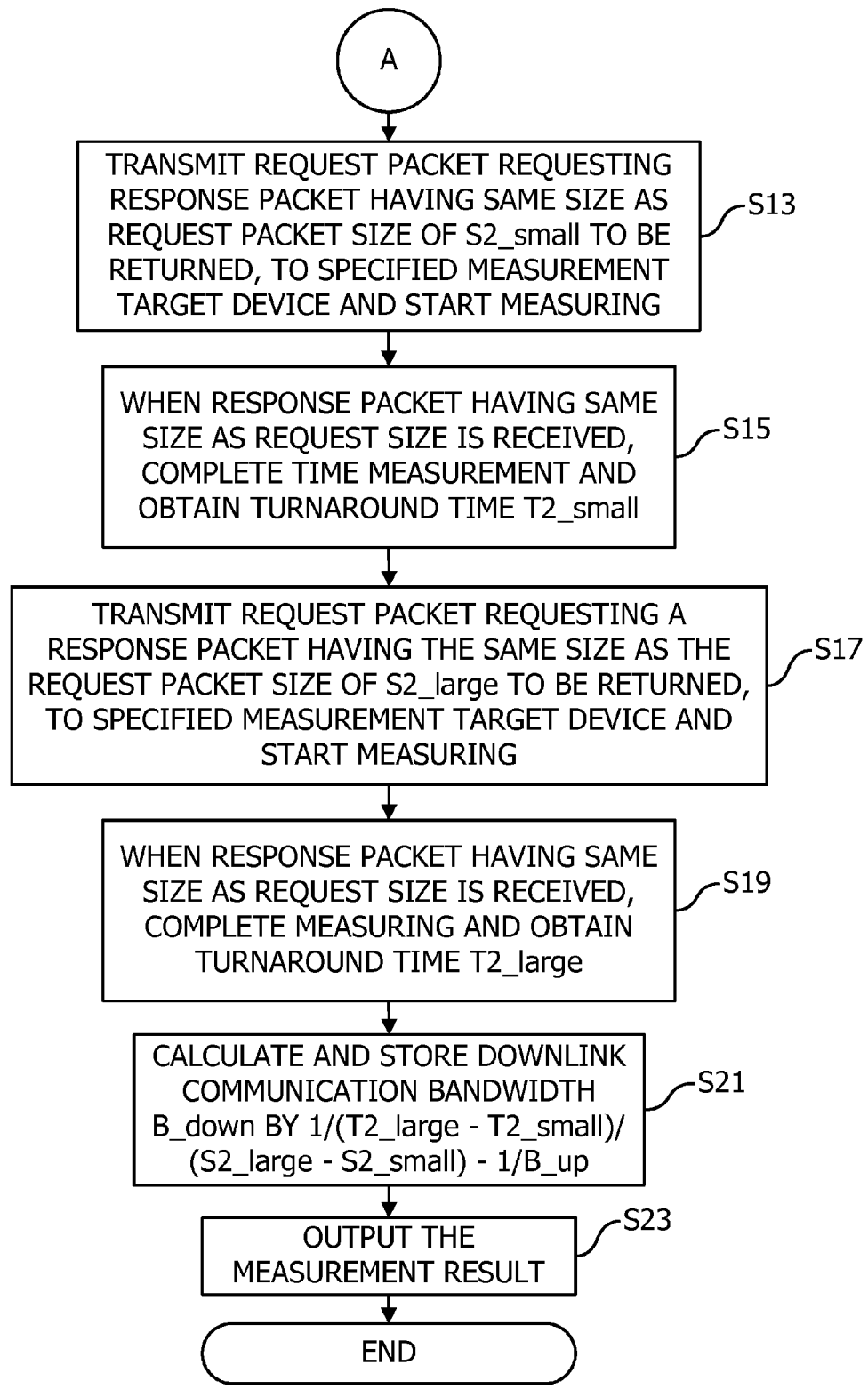
FIG. 6 is a flowchart of a process in accordance with the embodiment of the present technique.

By referring to FIG. 6, next, the band measurement section 12 instructs the packet transmission section 131 of the communication section 13 to transmit a request packet requesting a response packet having the same size as the size of S2_small to be returned, to the specified measurement target device 3. In response to the instruction from the band measurement section 12, the packet transmission section 131 transmits the request packet requesting a response packet having the same size as the size of S2_small to be returned and the band measurement section 12 starts time measurement (Step S13).

As the request packet requesting a response packet having the same size as the size of S2_small to be returned, for example, a Ping request (ICMP Echo Request) packet can be used. If the packet is a Ping request packet, a Ping response packet having the same size as that of the received Ping request packet is returned. It should be noted that this is not limited to the Ping request packet, but any other type of packet may be used as long as the packet can achieve the above functions.

The request packet passes through the relay nodes 1 to n and the links connecting to these nodes and reaches the measurement target device 3. Then, in response to the request packet, the measurement target device 3 returns a response packet having the same S2_small response size, to the band measuring device 1 which transmitted the request packet.

When the Ping response packet having the same size as that of the request packet is transmitted from the measurement target device 3, and the response packet reaches the band measuring device 1 as described above, the packet receiving section 133 of the communication section 13 receives the response packet and notifies the band measurement section 12 of the receipt of the response packet. Then, the band measurement section 12 completes the time measurement which started at Step S13, obtains a turnaround time T2_small from when the measurement started to when the measurement completed, and stores the time in a storage device such as a main memory (Step S15).

Figure 7:
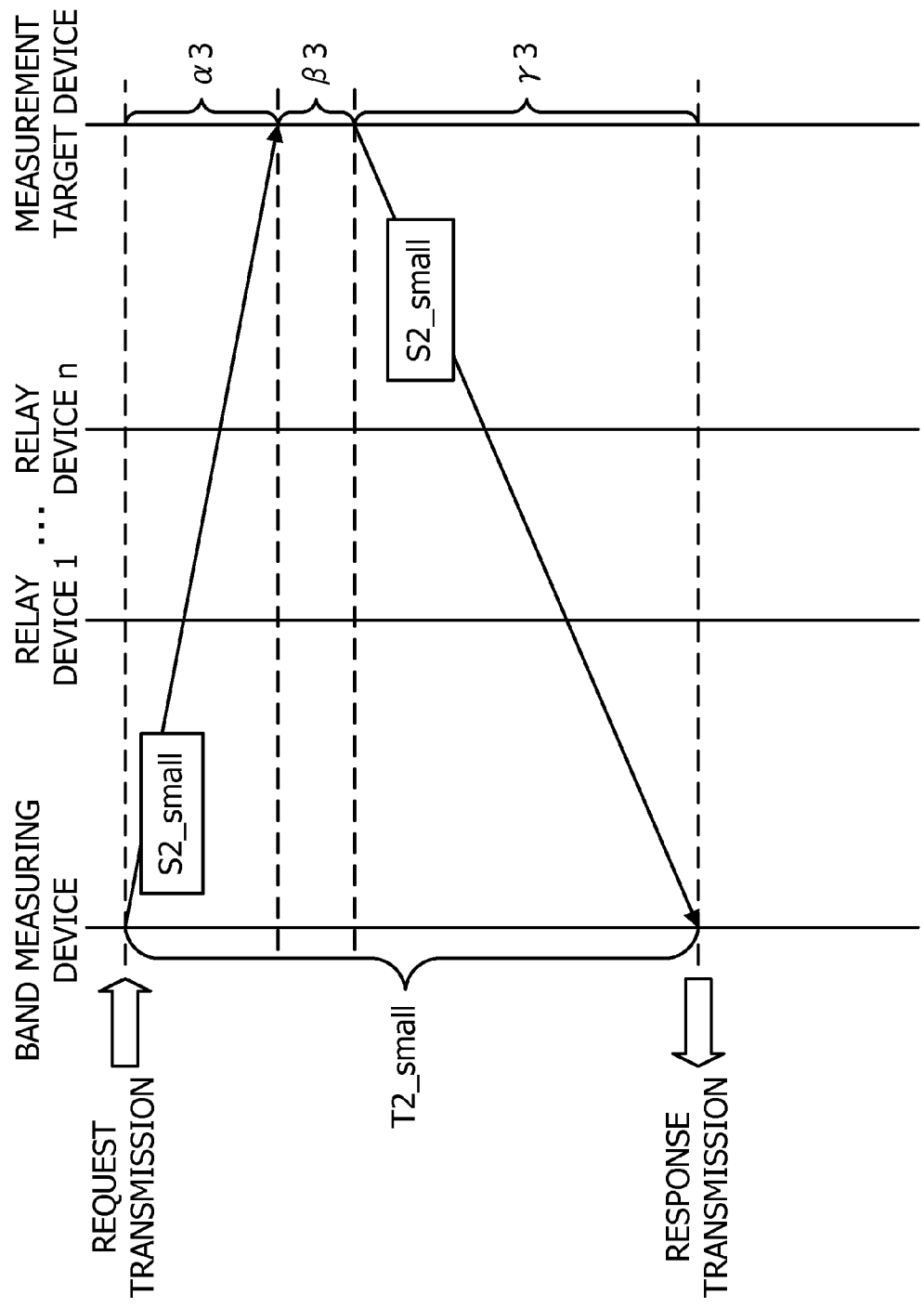
FIG. 7 illustrates an outline of a first measurement of a downlink communication bandwidth.

FIG. 7 illustrates a schematic view of Steps S13 and S15. First, a request packet having a size of S2_small is transmitted from the band measuring device 1 to the measurement target device 3. It takes time $\alpha 3$ corresponding to the uplink communication bandwidth. Then, the measurement target device 3 performs a process required for transmitting a response packet. It takes time $\beta 3$. Then, a response packet having the same size of S2_small is transmitted from the measurement target device 3 to the band measuring device 1. It takes time $\gamma 3$ corresponding to the downlink communication bandwidth. Thus, the turnaround time T2_small measured in this manner is expressed by $T2\_small=\alpha 3+\beta 3+\gamma 3$.

By referring back to FIG. 6, next, the band measurement section 12 instructs the packet transmission section 131 of the communication section 13 to transmit a request packet requesting a response packet having the same size as the request packet size of S2_large to be returned, to the specified measurement target device 3. In response to the instruction from the band measurement section 12, the packet transmission section 131 transmits the request packet requesting a response packet having the same size as the request packet size of S2_large to be returned, to the specified measurement target device 3, and the band measurement section 12 starts time measurement (Step S17).

The request packet passes through the relay nodes 1 to n and the links connecting to these nodes and reaches the measurement target device 3. Then, in response to the request packet, the measurement target device 3 returns a response packet having the same response size of S2_large, to the band measuring device 1 which transmitted the request packet.

When a response packet having a size of S2_large is transmitted from the measurement target device 3, and the response packet reaches the band measuring device 1 as described above, the packet receiving section 133 of the communication section 13 receives the response packet and notifies the band measurement section 12 of the receipt of the response packet. Then, the band measurement section 12 completes the time measurement which started at Step S17, obtains a turnaround time T2_large from when the measurement started to when the measurement completed, and stores the time in a storage device such as a main memory (Step S19).

Figure 8:
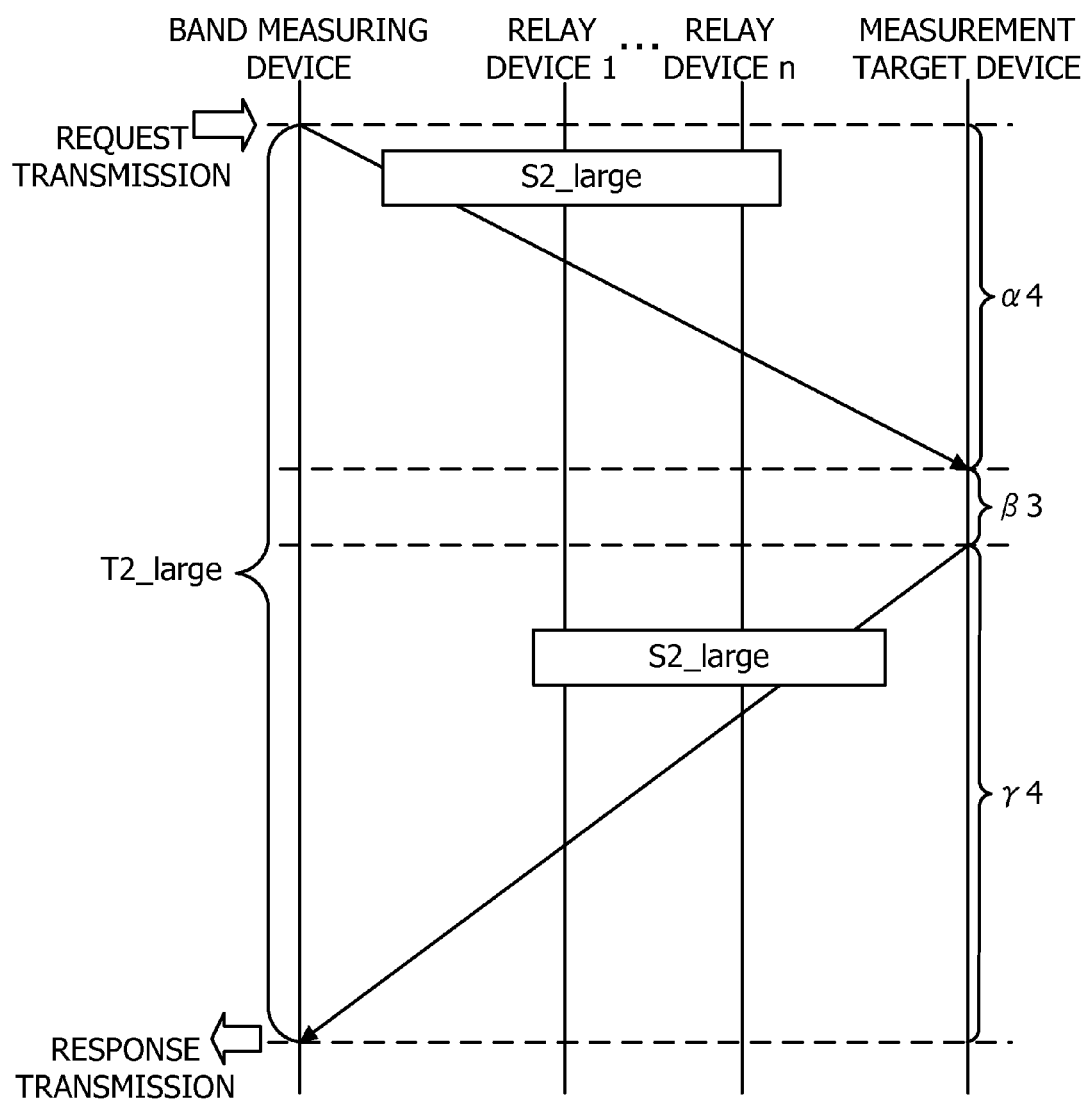
FIG. 8 illustrates an outline of a second measurement of the downlink communication bandwidth.

FIG. 8 illustrates a schematic view of Steps S17 and S19. First, a request packet having a size of S2_large is transmitted from the band measuring device 1 to the measurement target device 3. It takes time $\alpha 4$ corresponding to the uplink communication bandwidth. Then, the measurement target device 3 performs a process required for transmitting a response packet. It takes time $\beta 3$, which is not affected by the size, large or small, of the request packet. Then, a response packet having the same size of S2_large as the request packet is transmitted from the measurement target device 3 to the band measuring device 1. It takes time $\gamma 4$ corresponding to the downlink communication bandwidth. Thus, the turnaround time T2_large measured in this manner is expressed by $T2\_large=\alpha 4+\beta 3+\gamma 4$.

Here, $\alpha 4-\alpha 3=(S2\_large-S2\_small)/B\_up$, and $\gamma 4-\gamma 3=(S2\_large-S2\_small)/B\_down$. In addition, $T2\_large-T2\_small=\alpha 4+\beta 3+\gamma 4-(\alpha 3+\beta 3+\gamma 3)=\alpha 4-\alpha 3+\gamma 4-\gamma 3$. Further, the uplink communication bandwidth B_up is obtained at Step S11. Thus, the following relation is obtained.

$$B\_down=1/\{(T2\_large-T2\_small)/(S2\_large-S2\_small)-1/B\_up\} \quad (2)$$

Thus, the band measurement section 12 calculates the downlink communication bandwidth B_down according to the above expression, and stores the bandwidth in a storage device such as a main memory (Step S21). Then, the band measurement section 12 presents the user with the uplink communication bandwidth B_up and the downlink communication bandwidth B_down through the user interface section 11 (Step S23). For example, an instruction may be sent to a display device to display them or to a printer to print them. Further, an instruction may be sent to a recording device such as a hard disk drive of the band measuring device 1 to store them by associating them with an identifier of the measurement target device 3.

The above described processes allow the band measuring device 1 to obtain available uplink communication bandwidth B_up and downlink communication bandwidth B_down without a need to install a special function in the measurement target device 3.

It should be noted that in the example given, both the uplink and the downlink are measured at once, but only the uplink may be measured. Further, if the available uplink communication bandwidth B_up has already been obtained by some other technique, only the available downlink communication bandwidth B_down may be measured at Steps S13 to S21.

Further, although not described above, measurement may be performed a plurality of number of times, and the average may be calculated.

First Specific Example

A first specific example of bandwidth measurement will be described with reference to FIGS. 9 to 12. Here is assumed that an IP transfer on the Ethernet™ is used. Moreover, both the band measuring device 1 and the measurement target device 3 are assumed to have a standard maximum transmission unit (MTU) of 1514 bytes.

Figure 9:
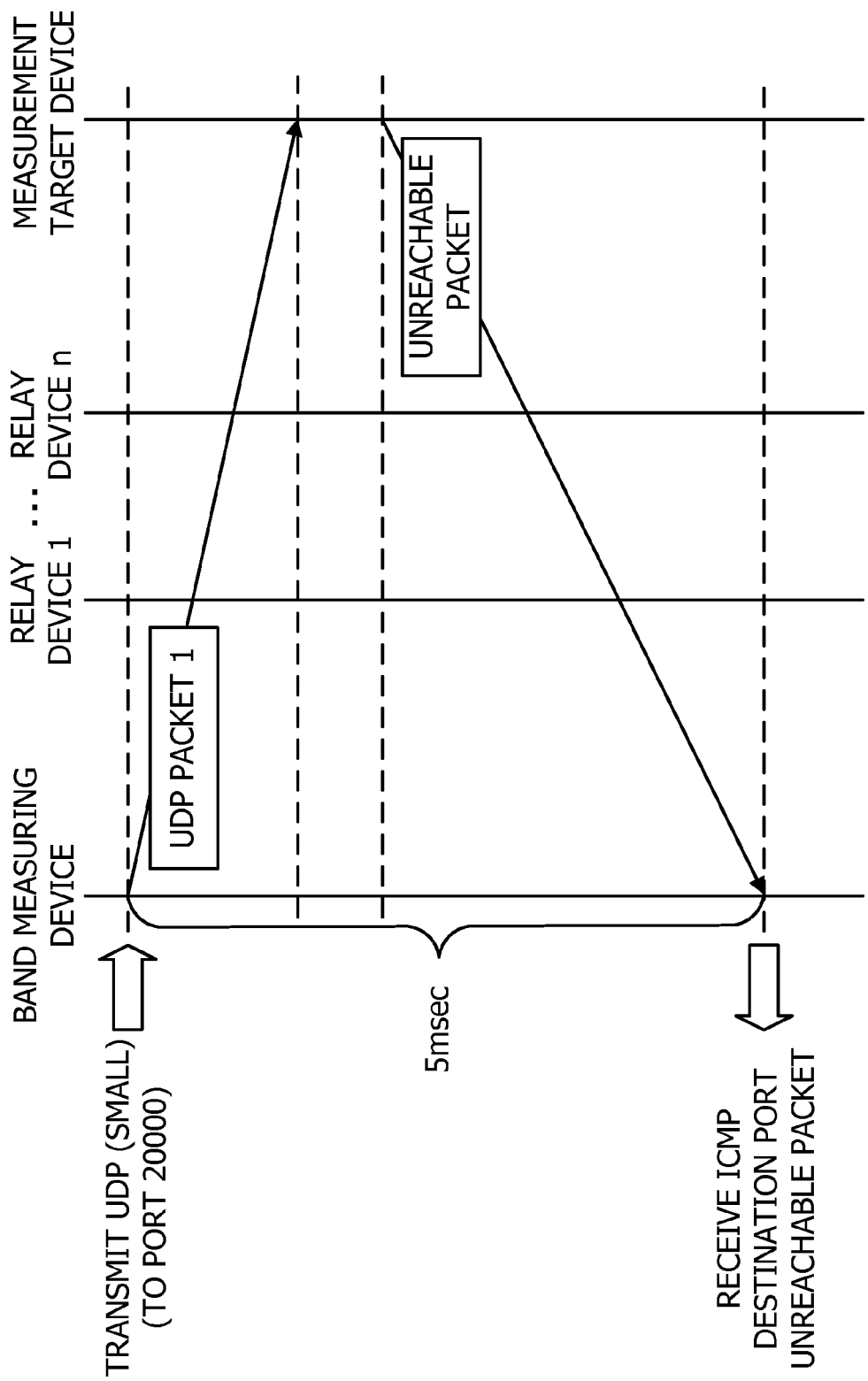
FIG. 9 illustrates an outline of a first measurement of an uplink communication bandwidth in the case of no fragmentation.

First, as illustrated in FIG. 9, the band measuring device 1 transmits a small UDP packet as a UDP packet 1 to, for example, port 20000 of the measurement target device 3. The packet is a total of 614 bytes: an Ether header of 14 bytes, an IP header of 20 bytes, a UDP header of 8 bytes and a UDP payload of 572 bytes (any content). In response to this UDP packet, the measurement target device 3 returns an unreachable packet, that is, ICMP Destination Port Unreachable response, to the band measuring device 1. The original UDP packet data should be embedded into this response payload, but if the UDP packet size exceeds the upper limit of the response payload, only part thereof is embedded. For example, the size of the ICMP Destination Port Unreachable response is 590 bytes which includes an Ether header of 14 bytes, an IP header of 20 bytes, an ICMP header of 8 bytes, and an ICMP payload of 548 bytes. It should be noted that the upper limit of 590 bytes is just an example and depends on the type of the measurement target device 3, the operating system (OS), and the like.

The band measuring device 1 measures the time from when the UDP packet 1 is transmitted to when the ICMP Destination Port Unreachable response is received. FIG. 9 illustrates a case where it takes 5 msec.

Figure 10:
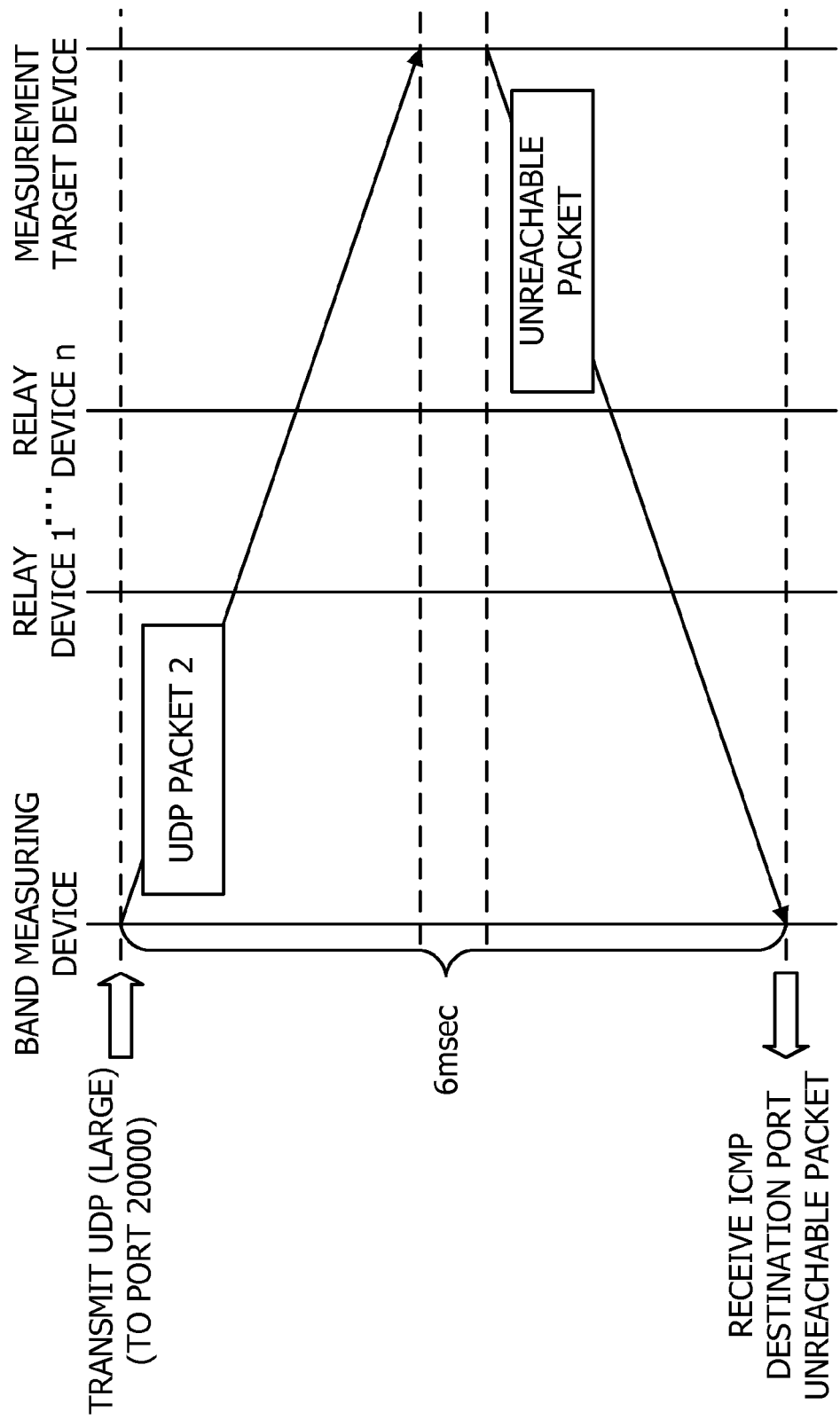
FIG. 10 illustrates an outline of a second measurement of the uplink communication bandwidth in the case of no fragmentation.

Next, as illustrated in FIG. 10, the band measuring device 1 transmits a large UDP packet as a UDP packet 2 to, for example, port 20000 of the measurement target device 3. The packet is a total of 1514 bytes: an Ether header of 14 bytes, an IP header of 20 bytes, a UDP header of 8 bytes and a UDP payload of 1472 bytes (any content). In response to this UDP packet, the measurement target device 3 returns an unreachable packet, that is, ICMP Destination Port Unreachable response, to the band measuring device 1. The size of this response is 590 bytes which is the same as described in FIG. 9.

The band measuring device 1 measures the time from when the UDP packet 2 is transmitted to when the ICMP Destination Port Unreachable response is received. FIG. 10 illustrates a case where it takes 6 msec.

The following expression is obtained from the above measurement results and expression (1).

The uplink communication bandwidth $B\_up=\{(1514-614)*8\}/\{(6-5)/1000\}=7200000[bps]=7.2$ [Mbps].

Figure 11:
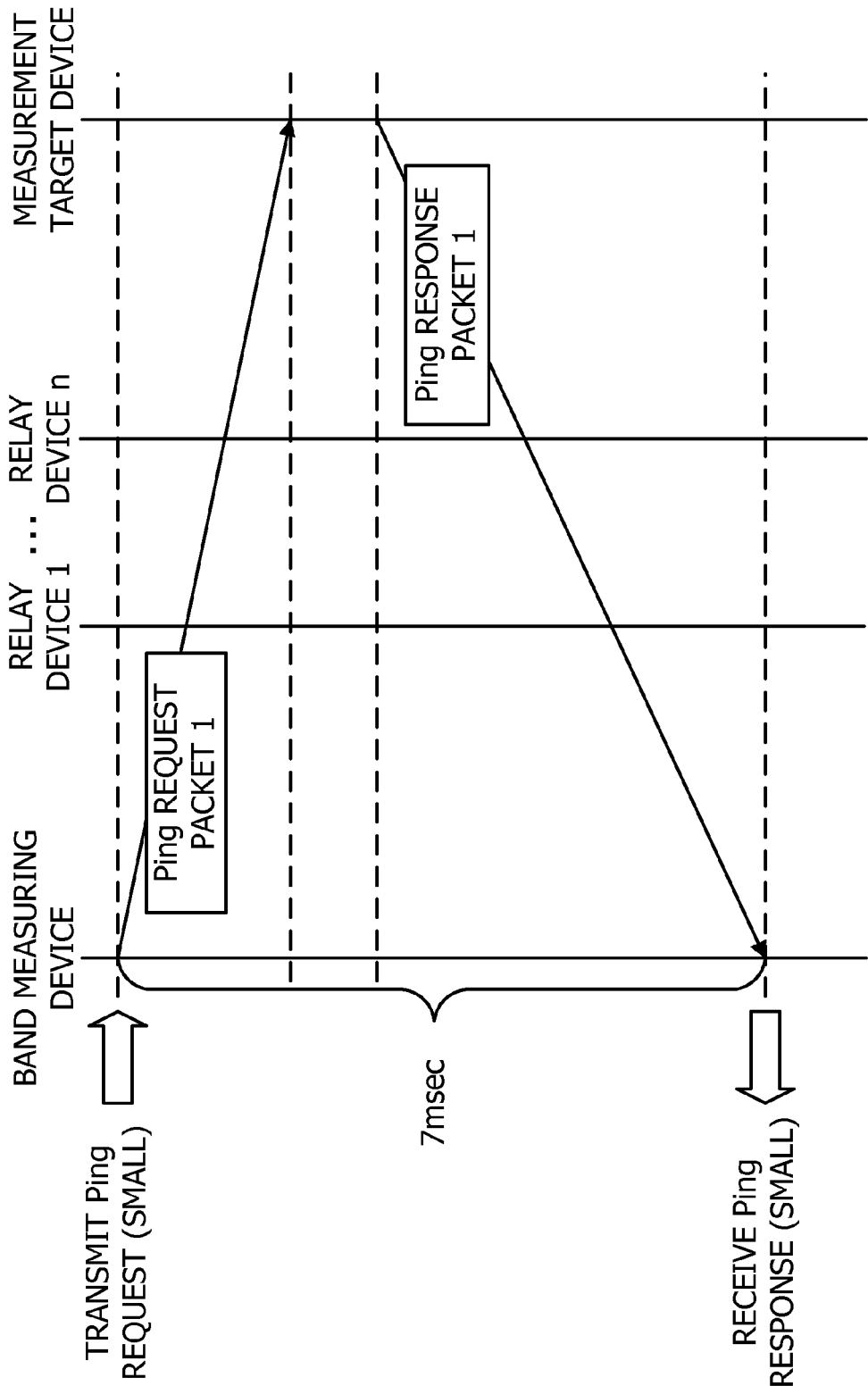
FIG. 11 illustrates an outline of a first measurement of a downlink communication bandwidth in the case of no fragmentation.

Next, as illustrated in FIG. 11, the band measuring device 1 transmits a small Ping request packet (i.e., ICMP Echo Request) as a Ping request packet 1 to the measurement target device 3. The total packet size is 614 bytes: an Ether header of 14 bytes, an IP header of 20 bytes, an ICMP header of 8 bytes and an ICMP payload of 572 bytes (any content). In response to this packet, the measurement target device 3 returns a small Ping response packet (i.e., ICMP Echo Reply) as a Ping response packet 1. The response packet is a total of 614 bytes: an Ether header of 14 bytes, an IP header of 20 bytes, an ICMP header of 8 bytes and an ICMP payload of 572 bytes which is the same as the Ping request packet 1.

The band measuring device 1 measures the time from when the Ping request packet 1 is transmitted to when the Ping response packet 1 is received. FIG. 11 illustrates a case where it takes 7 msec.

Figure 12:
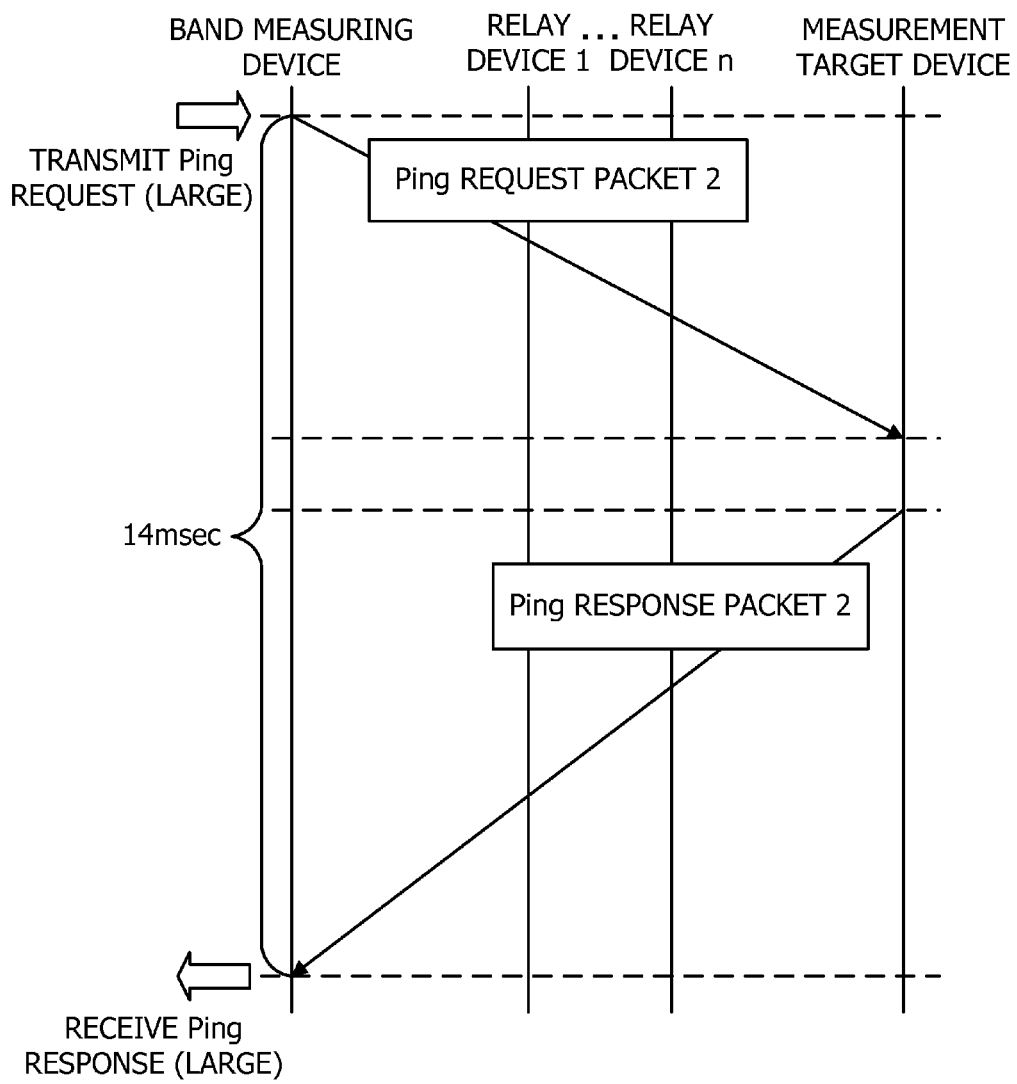
FIG. 12 illustrates an outline of a second measurement of the downlink communication bandwidth in the case of no fragmentation.

Next, as illustrated in FIG. 12, the band measuring device 1 transmits a large Ping request packet as a Ping request packet 2 to the measurement target device 3. The total packet size is 1514 bytes: an Ether header of 14 bytes, an IP header of 20 bytes, an ICMP header of 8 bytes and an ICMP payload of 1472 bytes (any content). In response to this packet, the measurement target device 3 returns a large Ping response packet as a Ping response packet 2. The response packet is a total of 1514 bytes: an Ether header of 14 bytes, an IP header of 20 bytes, an ICMP header of 8 bytes and an ICMP payload of 1472 bytes which is the same as the Ping request packet 2.

The band measuring device 1 measures the time from when the Ping request packet 2 is transmitted to when the Ping response packet 2 is received. FIG. 12 illustrates a case where it takes 14 msec.

The following expression is obtained from the above measurement results, the uplink communication bandwidth B_up and expression (2). The downlink communication bandwidth $B\_down=1/\{\{(14-7)/1000\}/\{(1514-614)*8\}-1/7200000\}=1200000[bps]=1.2$ Mbps.

As described above, measurement can be performed under the condition where the size of a request and a response is within a packet, but it is understood from the FIGS. 9 to 12 that the time difference tends to be smaller. In this case, the measurement result may contain some measurement errors, and thus it is difficult to increase measurement accuracy.

Second Specific Example

A second specific example of bandwidth measurement will be described with reference to FIGS. 13 to 16. Here is assumed that an IP transfer on the Ethernet™ is used. Moreover, both the band measuring device 1 and the measurement target device 3 are assumed to have a standard maximum transmission unit (MTU) of 1514 bytes. Further, fragmentation is assumed to be used as described later.

Figure 13:
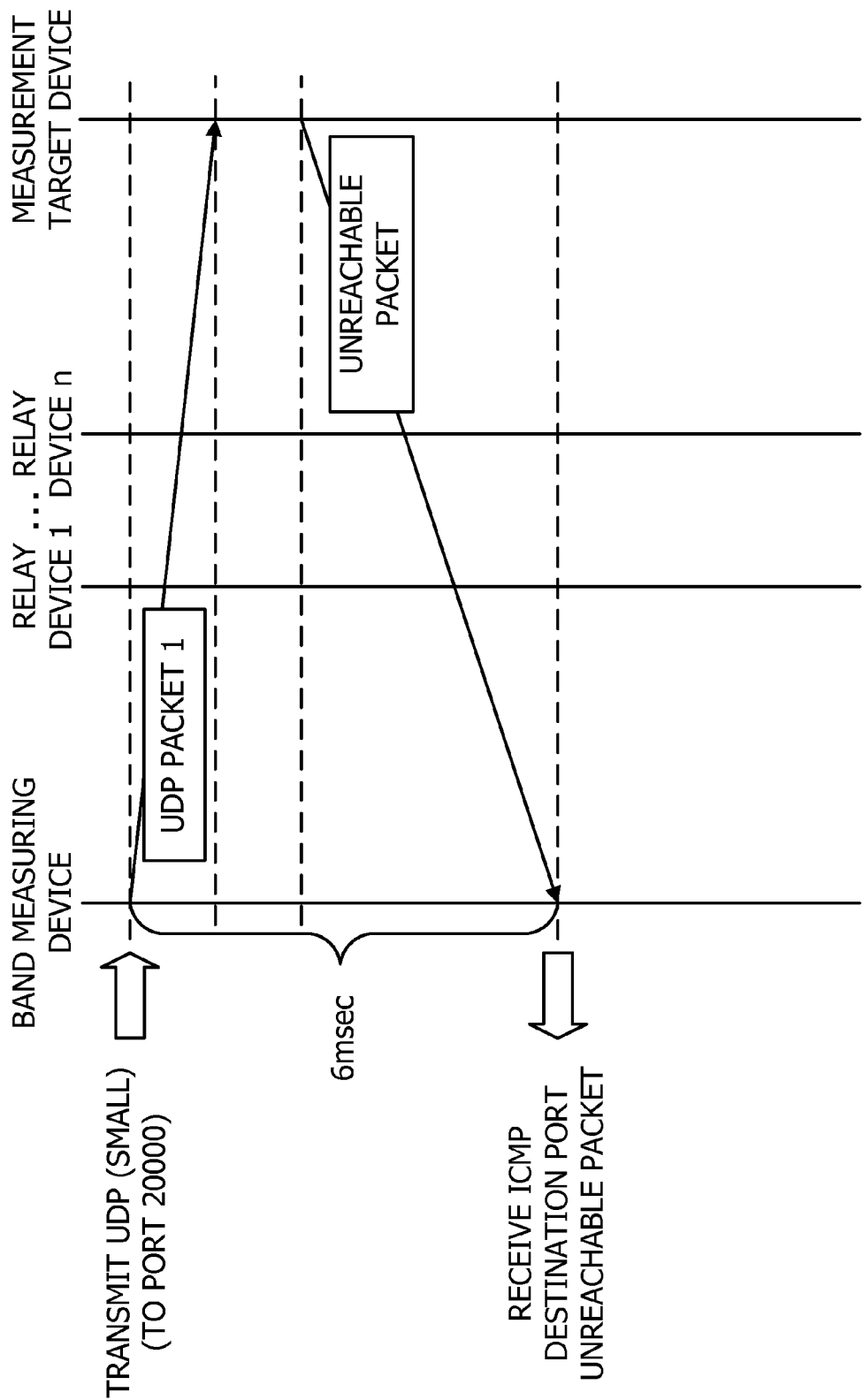
FIG. 13 illustrates an outline of a first measurement of an uplink communication bandwidth in the case of a fragmentation.

First, as illustrated in FIG. 13, the band measuring device 1 transmits a small UDP packet as a UDP packet 1 to, for example, port 20000 of the measurement target device 3. The packet is a total of 1514 bytes: an Ether header of 14 bytes, an IP header of 20 bytes, a UDP header of 8 bytes and a UDP payload of 1472 bytes (any content). In response to this packet, the measurement target device 3 returns an unreachable packet, that is, ICMP Destination Port Unreachable response, to the band measuring device 1. The original UDP packet data should be embedded into this response ICMP payload, but if the packet size exceeds the upper limit of the response payload, only part thereof is embedded. For example, the size of the ICMP Destination Port Unreachable response is 590 bytes which includes an Ether header of 14 bytes, an IP header of 20 bytes, an ICMP header of 8 bytes, and an ICMP payload of 548 bytes. It should be noted that the upper limit of 590 bytes is just an example and depends on the type of the measurement target device 3, the operating system (OS), and the like.

The band measuring device 1 measures the time from when the UDP packet 1 is transmitted to when the ICMP Destination Port Unreachable response is received. FIG. 13 illustrates a case where it takes 6 msec.

Figure 14:
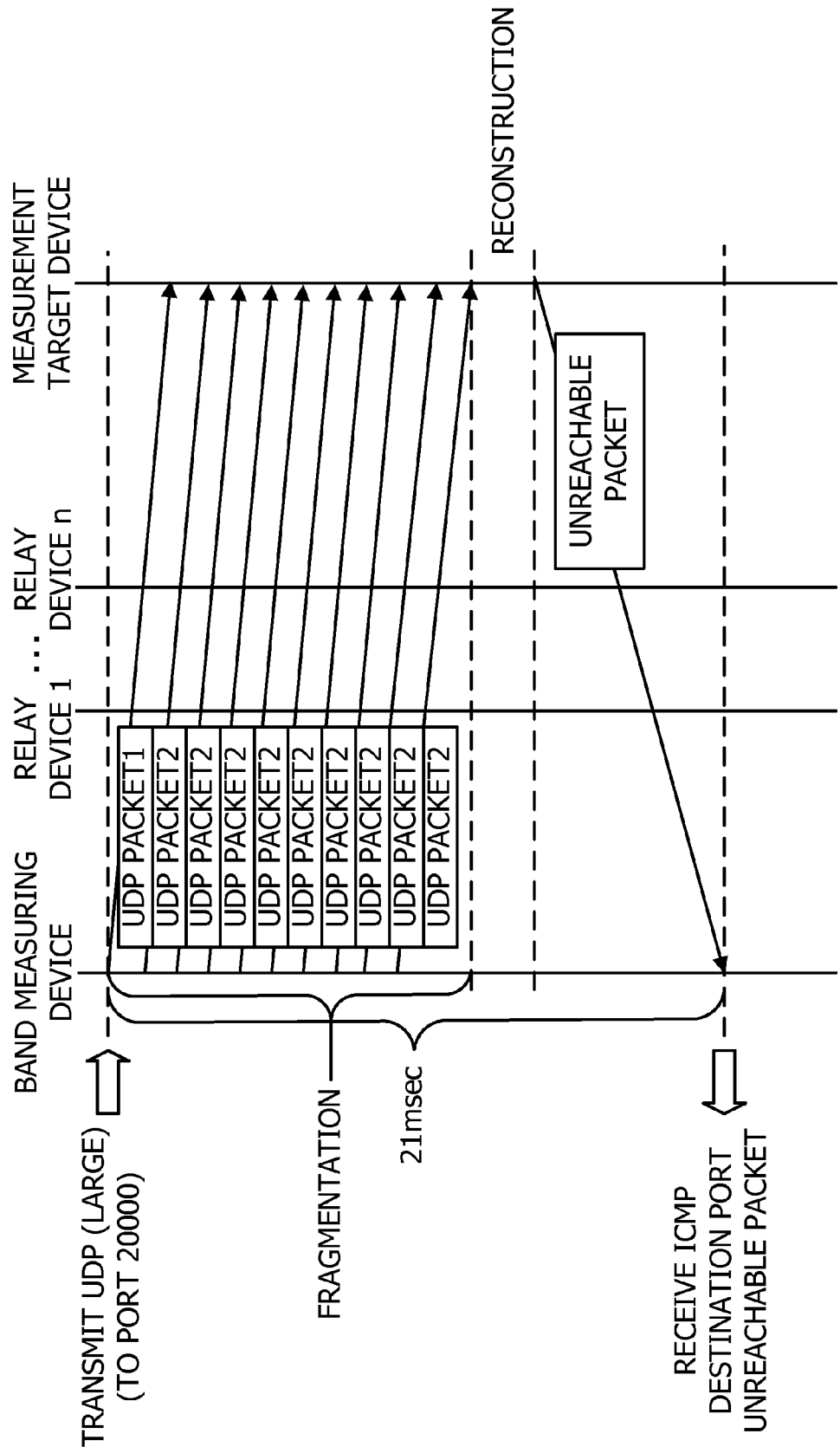
FIG. 14 illustrates an outline of a second measurement of the uplink communication bandwidth in the case of a fragmentation.

Next, as illustrated in FIG. 14, the band measuring device 1 transmits a UDP packet including a UDP payload of 14792 bytes. Note that the UDP packet is fragmented into 10 packets so as not to exceed the MTU. More specifically, the first packet is transmitted as a UDP packet 1 to, for example, port 20000 of the measurement target device 3. The packet is a total of 1514 bytes: an Ether header of 14 bytes, an IP header of 20 bytes, a UDP header of 8 bytes and a UDP payload of 1472 bytes. Each of the remaining nine UDP packets is transmitted as a UDP packet 2 to, for example, port 20000 of the measurement target device 3. The packet is a total of 1514 bytes: an Ether header of 14 bytes, an IP header of 20 bytes, and a UDP payload of 1480 bytes.

In response to this, the measurement target device 3 receives the fragmented 10 UDP packets and reconstructs the UDP packet. Since unrespondable port is specified, the measurement target device 3 returns an ICMP Destination Port Unreachable response, to the band measuring device 1. The response packet is a total of 590 bytes: an Ether header of 14 bytes, an IP header of 20 bytes, an ICMP header of 8 bytes and an ICMP payload of 548 bytes. Note that this payload contains part of the payload of the received UDP packet.

The band measuring device 1 measures the time from when the UDP packets are transmitted to when the ICMP Destination Port Unreachable response is received. FIG. 14 illustrates a case where it takes 21 msec.

The following expression is obtained from the above measurement results and expression (1).

The uplink communication bandwidth $B\_up = \{(1514*10-1514)*8\}/\{(21-6)/1000\} \approx 7267200[bps] = 7.3[Mbps]$.

Figure 15:
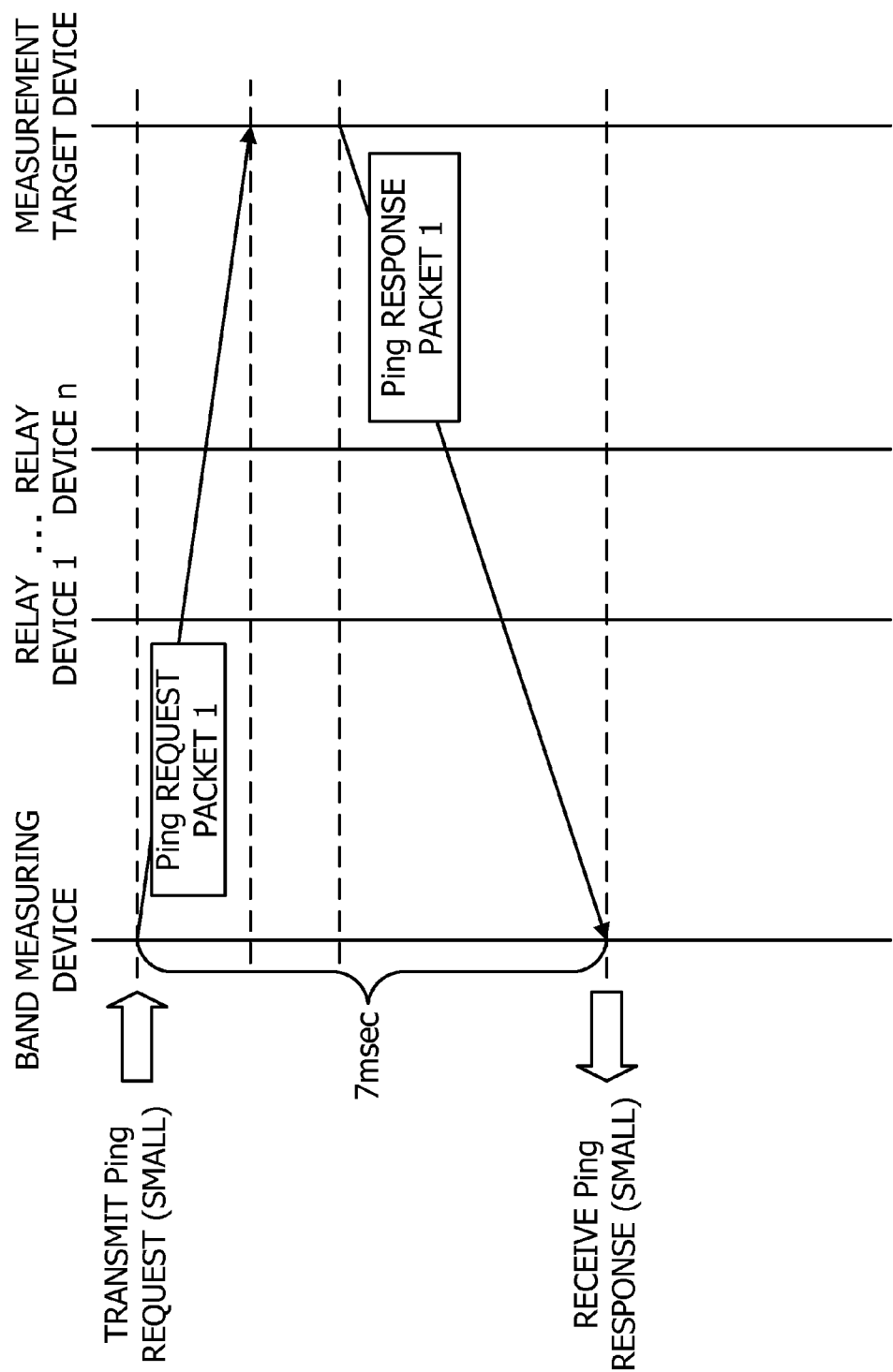
FIG. 15 illustrates an outline of a first measurement of a downlink communication bandwidth in the case of a fragmentation.

Next, as illustrated in FIG. 15, the band measuring device 1 transmits a small Ping request packet (i.e., ICMP Echo Request) as a Ping request packet 1 to the measurement target device 3. The total packet size is 614 bytes: an Ether header of 14 bytes, an IP header of 20 bytes, an ICMP header of 8 bytes and an ICMP payload of 572 bytes (any content). In response to this packet, the measurement target device 3 returns a small Ping response packet (i.e., ICMP Echo Reply) as a Ping response packet 1. The response packet is a total of 614 bytes: an Ether header of 14 bytes, an IP header of 20 bytes, an ICMP header of 8 bytes and an ICMP payload of 572 bytes which is the same as the Ping request packet 1.

The band measuring device 1 measures the time from when the Ping request packet 1 is transmitted to when the Ping response packet 1 is received. FIG. 15 illustrates a case where it takes 7 msec.

Figure 16:
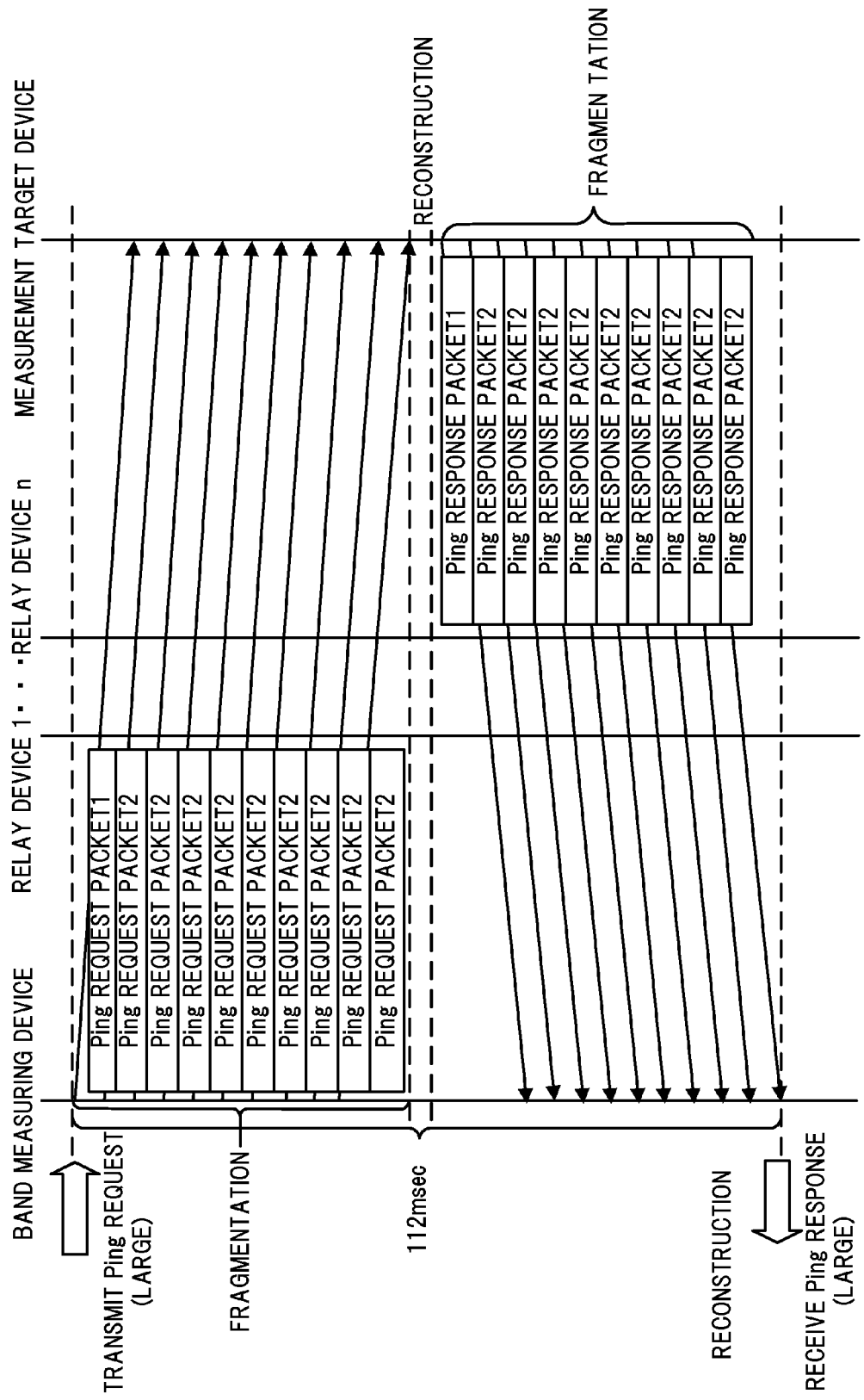
FIG. 16 illustrates an outline of a second measurement of the downlink communication bandwidth in the case of a fragmentation.

Next, as illustrated in FIG. 16, the band measuring device 1 tries to transmit a Ping request including an ICMP payload of 14792 bytes. Note that this request packet is fragmented into 10 packets so as not to exceed the MTU. More specifically, the first ICMP Echo Request packet is transmitted as a Ping request packet 1 to the measurement target device 3. The packet is a total of 1514 bytes: an Ether header of 14 bytes, an IP header of 20 bytes, an ICMP header of 8 bytes and an ICMP payload of 1472 bytes. Each of the remaining nine ICMP Echo Request packets is transmitted as a Ping request packet 2 to the measurement target device 3. The request packet is a total of 1514 bytes: an Ether header of 14 bytes, an IP header of 20 bytes, and an ICMP payload of 1480 bytes.

In response to this, the measurement target device 3 receives the fragmented 10 ICMP Echo Request packets and reconstructs the Ping request. Further, the measurement target device 3 tries to transmit the Ping response including the ICMP payload contained in the reconstructed Ping request, to the band measuring device 1. Then, the Ping response is fragmented into 10 packets so as not to exceed the MTU. More specifically, the first ICMP Echo Reply packet is transmitted as the Ping response packet 1 to the measurement target device 3. The response packet is a total of 1514 bytes: an Ether header of 14 bytes, an IP header of 20 bytes, an ICMP header of 8 bytes and an ICMP payload of 1472 bytes. Each of the remaining nine ICMP Echo Reply packets is transmitted as a Ping response packet 2 to the band measuring device 1. The response packet is a total of 1514 bytes: an Ether header of 14 bytes, an IP header of 20 bytes, and an ICMP payload of 1480 bytes. The band measuring device 1 receives the fragmented 10 packets and reconstructs the Ping response.

The band measuring device 1 measures the time from when the Ping request is transmitted to when the reconstructed Ping response is received. FIG. 16 illustrates a case where it takes 112 msec.

The following expression is obtained from the above measurement results, the uplink communication bandwidth $B\_up$, and expression (2). The downlink communication bandwidth $B\_down = 1/\{\{(112-7)/1000\}/\{(1514*10-1514)*8\} - 1/7267200\} = 1211200[bps] \approx 1.2$ Mbps.

As described above, an increase in size of S_large can increase measurement time and reduce measurement errors, resulting in communication bandwidth accuracy.

First Application Example

The band measuring device 1 measures an individually specified measurement target device 3, in some cases, while in other cases the band measuring device 1 needs to measure a plurality of preliminarily set or specified measurement target devices 3. However, it takes too much time to simply execute the aforementioned processes serially.

Figure 17:
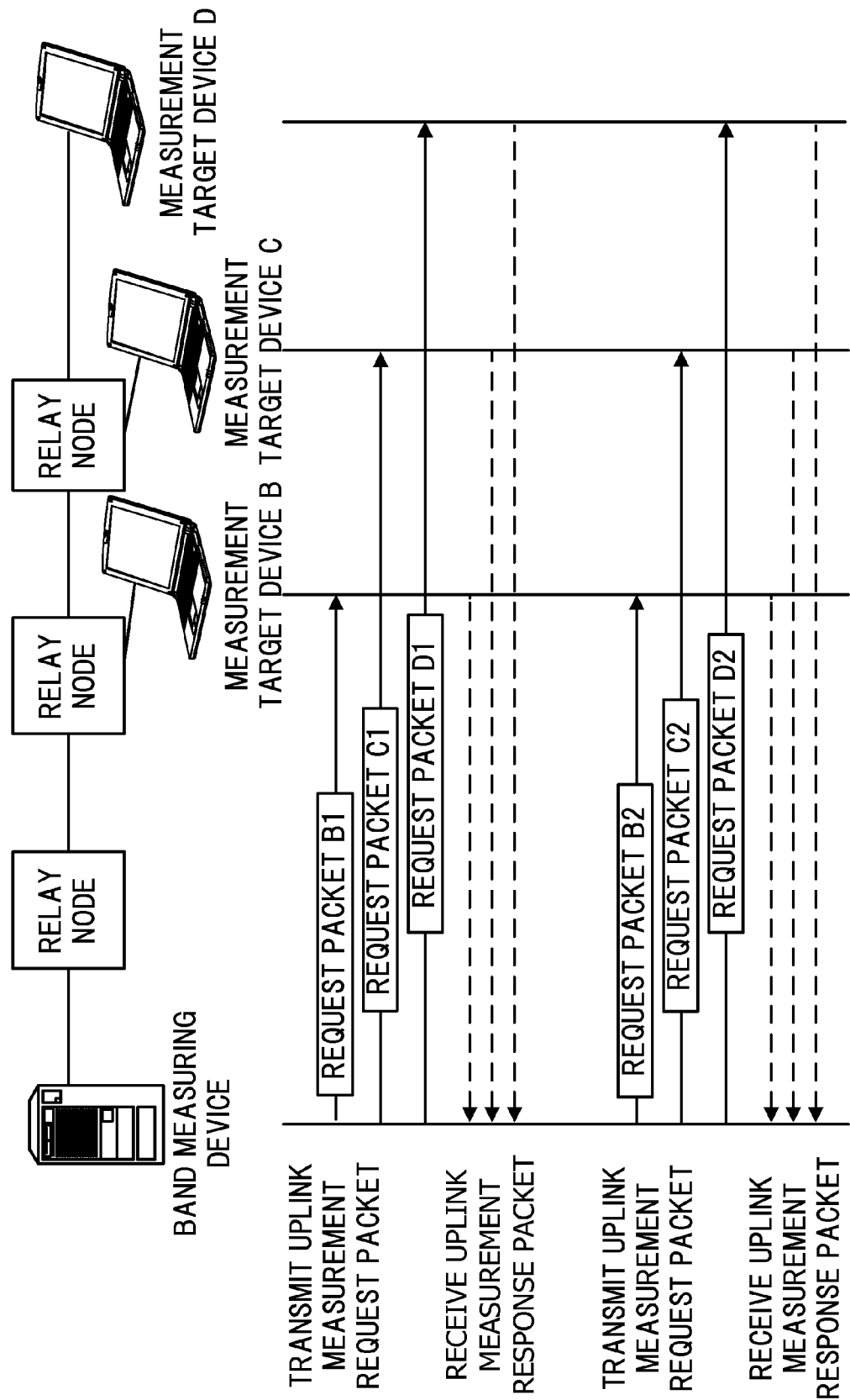
FIG. 17 illustrates an outline of measuring a plurality of measurement target devices.

As illustrated in FIG. 17, for example, when three measurement target devices B to D are to be measured, an uplink measurement request packet B1 to the measurement target device B, an uplink measurement request packet C1 to the measurement target device C, and an uplink measurement request packet D1 to the measurement target device D are consecutively transmitted at a predetermined interval. Then, response packets are returned from the measurement target devices B to D in the order as illustrated by arrows in dotted line. This allows T_small to be measured for each of the measurement target devices B to D. Although the response packets may arrive in a different order, they can be distinguished by the IP address or the like.

Likewise, an uplink measurement request packet B2 to the measurement target device B, an uplink measurement request packet C2 to the measurement target device C, and an uplink measurement request packet D2 to the measurement target device D are consecutively transmitted at a predetermined interval. Then, a response packet is returned from each of the measurement target devices B to D in the order as illustrated by an arrow in dotted line. This allows T_large to be measured for each of the measurement target devices B to D.

In this manner, the measurement time can be reduced by multiplexing, and the uplink communication bandwidth of each measurement target device can be calculated. Although not illustrated in FIG. 17, the downlink communication bandwidth of each measurement target device can also be calculated by multiplexing.

By referring to FIG. 18, the summary of the process content will be described. First, the user interface section 11 of the band measuring device 1 prompts the user to specify the measurement target device and instruct measurement. When the user specifies the plurality of measurement target devices 3 (e.g., IP address, etc.) and instructs the measurement, the user interface section 11 accepts the specification of the plurality of measurement target devices 3 and the measurement instruction and outputs the measurement instruction including the specification of the plurality of measurement target devices 3, to the band measurement section 12 (FIG. 18: Step S31). When the measurement instruction including the specification of a plurality of measurement target devices 3 is received from the user interface section 11, the band measurement section 12 instructs the packet transmission section 131 of the communication section 13 to sequentially transmit an uplink measurement request packet to each of the specified plurality of measurement target devices 3. In response to the instruction from the band measurement section 12, the packet transmission section 131 transmits the uplink measurement request packet to each of the specified measurement target devices 3 and the band measurement section 12 starts time measurement (Step S33).

The individual request packet passes through the relay nodes 1 to n and the links connecting to these nodes and reaches each measurement target device 3. In response to the request packet, the each measurement target device 3 returns a response packet to the band measuring device 1 which transmitted the request packet.

When a response packet is transmitted from each of the plurality of measurement target devices 3, and the response packet reaches the band measuring device 1, the packet receiving section 133 of the communication section 13 receives the response packet and notifies the band measurement section 12 of the receipt of the response packet. Then, the band measurement section 12 completes the time measurement which started at Step S33, obtains the turnaround time from when the measurement started to when the measurement completed, and stores the time in a storage device such as a main memory (Step S35).

Figure 18:
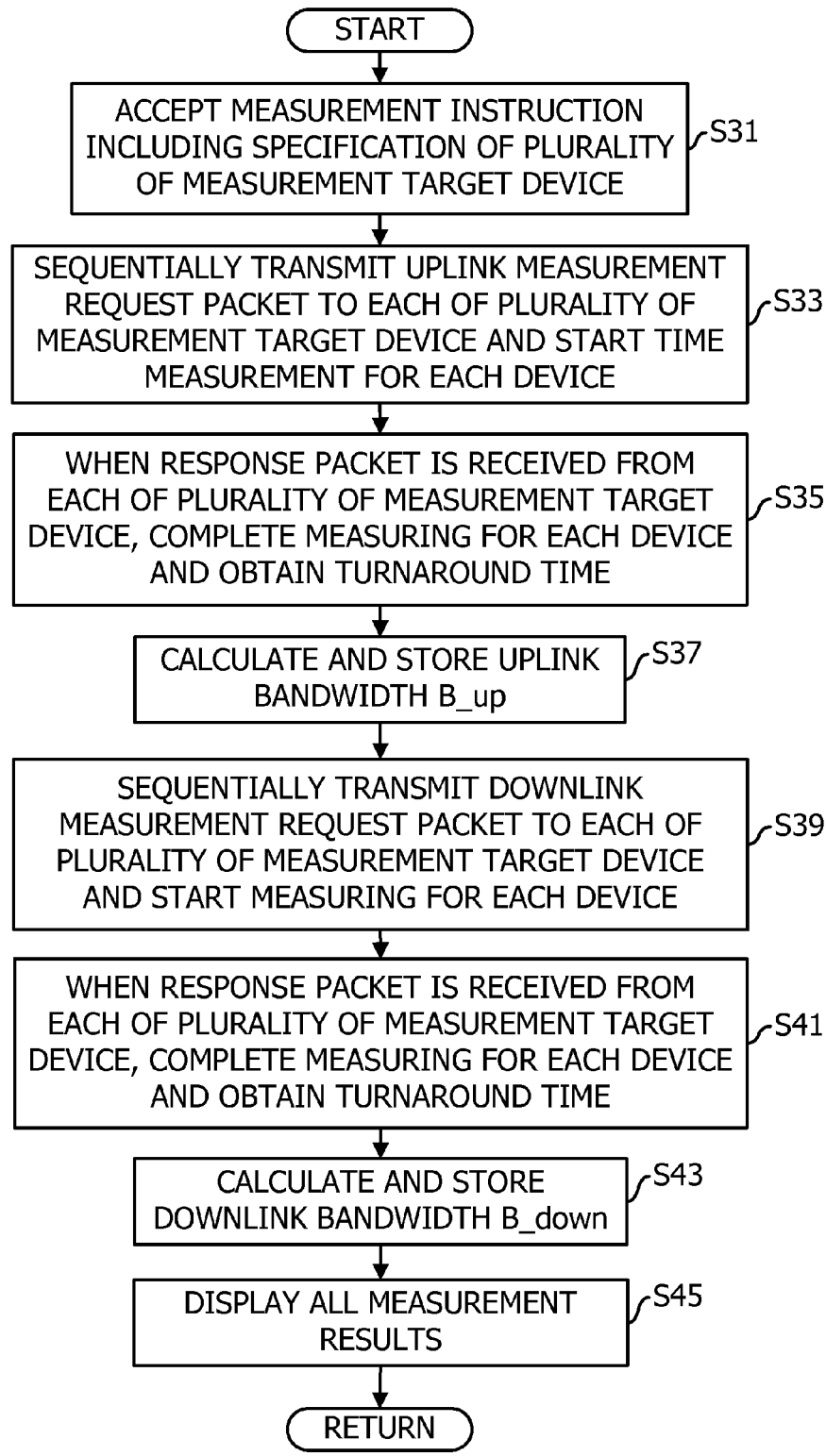
FIG. 18 is a flowchart of a process of measuring a plurality of measurement target devices.

Although not illustrated in FIG. 18, as described above, time measurement needs to be performed twice to measure the uplink communication bandwidth. Thus, another request packet is transmitted to each measurement target device and a response packet in response to this request packet is received from the each measurement target device for a second time measurement. Note that as illustrated in FIG. 17, two measurements are not necessarily performed serially, but at Step S33, two kinds of request packets may be consecutively transmitted to each measurement target device, and at Step S35, two kinds of response packets may be consecutively received to complete two time measurements. If a plurality of request packets are transmitted at an appropriate interval, not only a plurality of measurement target devices but also two measurements can be multiplexed.

Then, the band measurement section 12 calculates the uplink bandwidth B_up for each of the plurality of measurement target devices by $(S\_large-S\_small)/(T\_large-T\_small)$, and stores the result in a storage device such as a main memory (Step S37). At this stage, the uplink bandwidth B_up which is an individual measurement result may be presented to the user via the user interface section 11.

Then, the band measurement section 12 instructs the packet transmission section 131 of the communication section 13 to sequentially transmit a downlink measurement request packet to the specified plurality of measurement target devices 3. In response to the instruction from the band measurement section 12, the packet transmission section 131 transmits the downlink measurement request packet in series and the band measurement section 12 starts time measurement (Step S39).

The request packet passes through the relay nodes 1 to n and the links connecting to these nodes and reaches each measurement target device 3. Then, in response to the request packet, the each measurement target device 3 returns a response packet to the band measuring device 1 which transmitted the request packet.

When the response packet is transmitted from each of the plurality of measurement target devices 3, and the response packet reaches the band measuring device 1 as described above, the packet receiving section 133 of the communication section 13 receives the response packet and notifies the band measurement section 12 of the receipt of the response packet. Then, the band measurement section 12 completes the time measurement which started at Step S39, obtains the turnaround time from when the measurement started to when the measurement completed, and stores the time in a storage device such as a main memory (Step S41).

The processes at Steps S39 and S41 are applied to the processes at Steps S33 and S35 as is.

Then, the band measurement section 12 calculates the downlink communication bandwidth B_down for each measurement target device 3 according to the expression: $B\_down=1/\{(T2\_large-T2\_small)/(S2\_large-S2\_small)-1/B\_up\}$ and stores the bandwidth in a storage device such as a main memory (Step S43). Then, the band measurement section 12 presents the user with the uplink communication bandwidth B_up and the downlink communication bandwidth B_down for each measurement target device 3 through the user interface section 11 (Step S45). For example, an instruction may be sent to a display device to display them or to a printer to print them. Further, an instruction may be sent to a recording device such as a hard disk drive of the band measuring device 1 to store them by associating them with an identifier of the measurement target device 3.

The above described processes can reduce the entire measurement time of a plurality of measurement target devices and allow only the band measuring device 1 to obtain the uplink communication bandwidth B_up and the downlink communication bandwidth B_down for each measurement target device.

Note that if the place where the individual measurement target device 3 is installed has been known, a distribution map such as a bandwidth distribution can be generated.

Second Application Example

Figure 19:
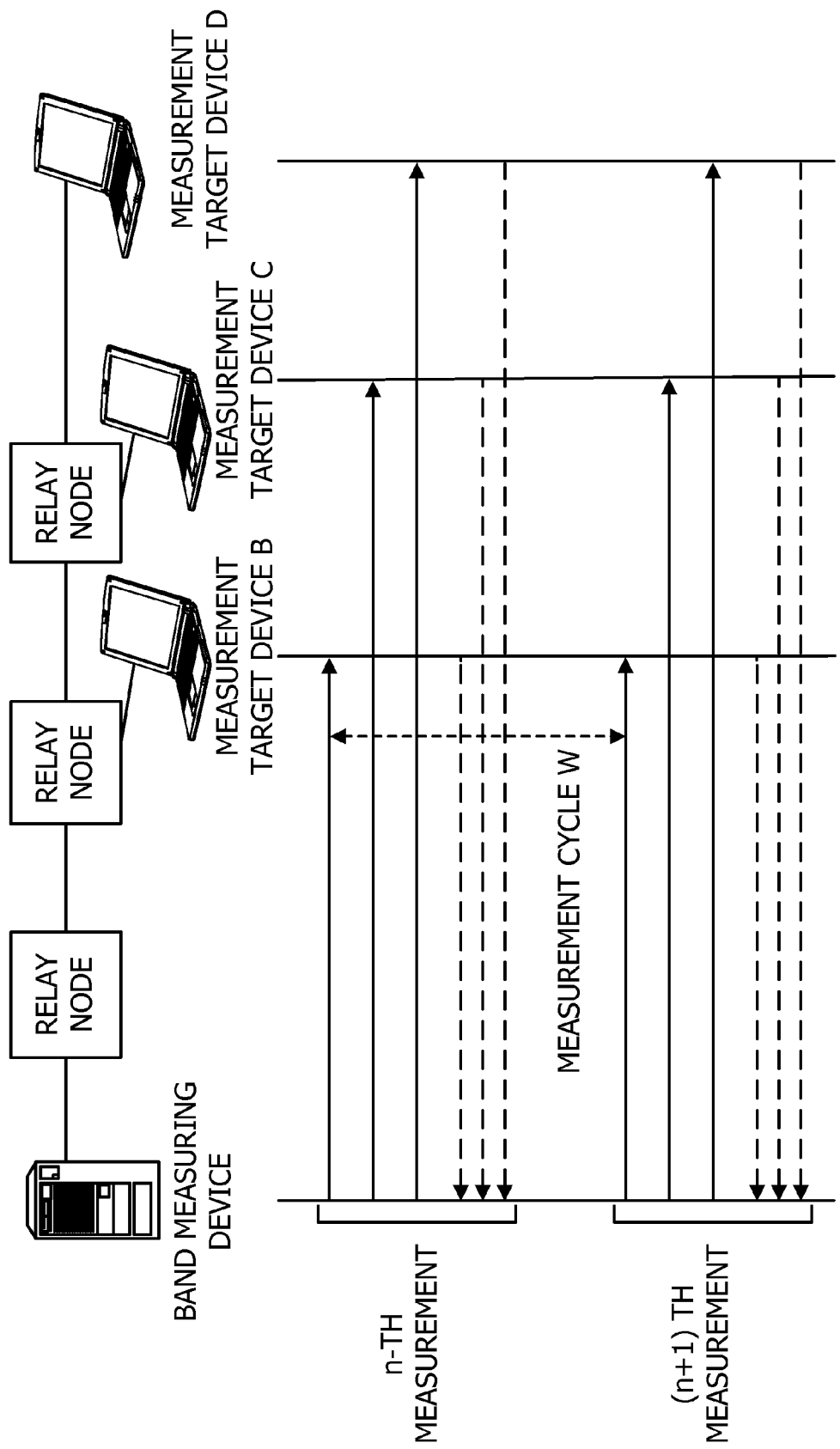
FIG. 19 illustrates an outline of a periodical measurement process.

An available communication bandwidth may change with time. Therefore, as illustrated in FIG. 19, a measurement cycle W may be set, and measurement may be repeated for each measurement cycle W. More specifically, for the n-th measurement, although not illustrated, a request packet transmission and a response packet receipt are performed four times to measure the uplink communication bandwidth B_up and the downlink communication bandwidth B_down. In addition, after the measurement cycle W, for the (n+1) th measurement, although not illustrated, a request packet transmission and a response packet receipt are performed four times to measure the uplink communication bandwidth B_up and the downlink communication bandwidth B_down. The time variation of an available communication bandwidth can be measured by repeating the above process.

Figure 20:
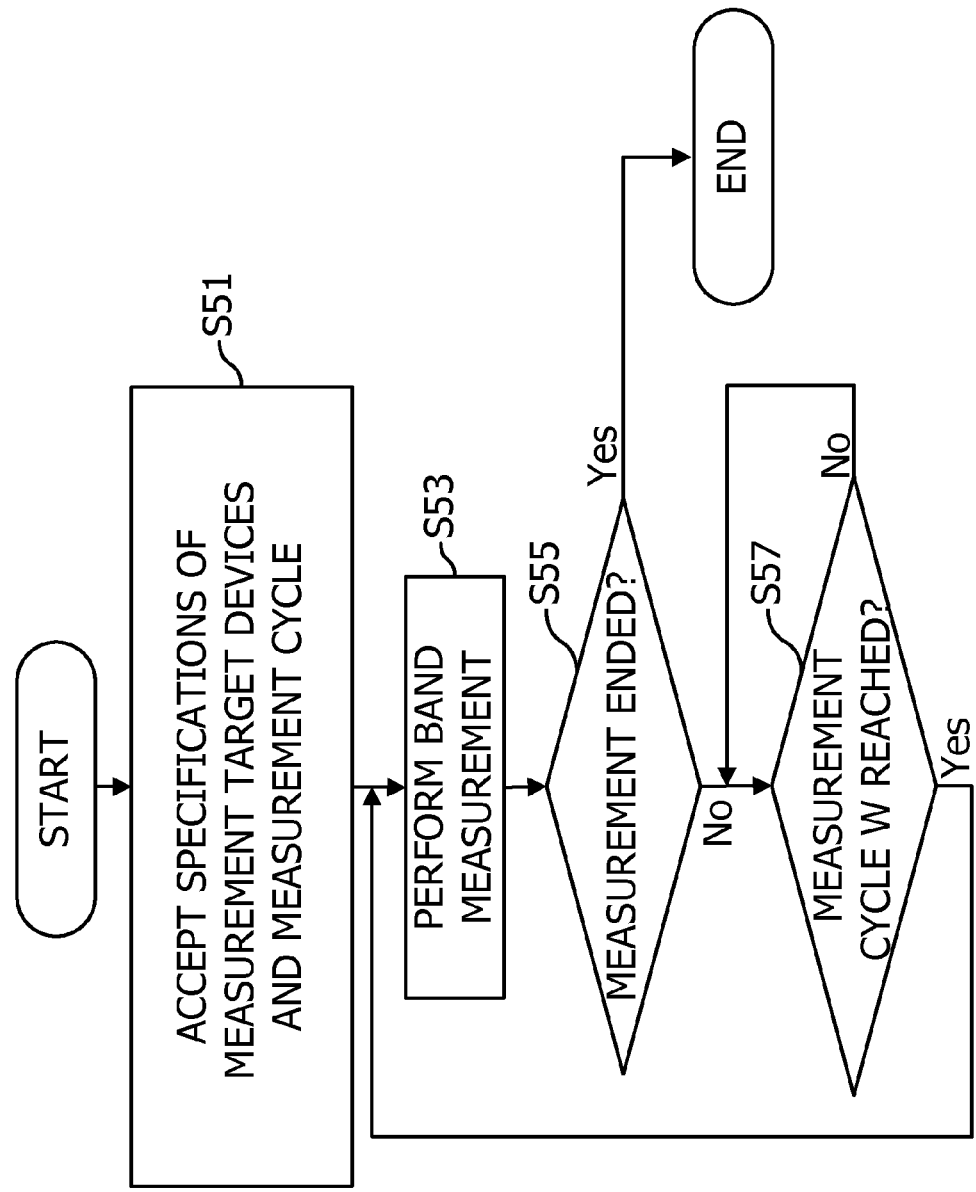
FIG. 20 is a flowchart of the periodical measurement process.

By referring to FIG. 20, the summary of the process content will be described. First, the user interface section 11 of the band measuring device 1 prompts the user to specify the measurement target device and the measurement cycle W, and instruct measurement. When the user specifies one or a plurality of measurement target devices 3 (e.g., IP address, etc.) and the measurement cycle W, and instructs the measurement, the user interface section 11 accepts the specification of the one or a plurality of measurement target devices 3 and the measurement cycle W, and the measurement instruction, and outputs the measurement instruction including the specification of the one or a plurality of measurement target devices 3 and the measurement cycle W, to the band measurement section 12 (FIG. 20: Step S51).

The band measurement section 12 and the communication section 13 perform bandwidth measurement as described above (Step S53). Note that the sections also start measuring the measurement cycle time. The content of the specific process is the same as before, and thus the description is omitted. Then, if a measurement end event (e.g., the user specified so or the end time arrived) is not detected (Step S55: No), the band measurement section 12 determines whether or not the measurement cycle W is reached (Step S57). If the measurement cycle W is not reached yet, the process returns to Step S57. On the other hand, if the measurement cycle W is reached (Step S57: Yes), the process returns to Step S53. That is, the bandwidth measurement is performed.

If a measurement end event is detected (Step S55: Yes), the process terminates.

The aforementioned processes can recognize the time variation of a communication bandwidth available for communication to and from each measurement target device. For example, time transition may be expressed by a graph or the like.

Hereinbefore, embodiments of the present technique have been described, but the present technique is not limited to these embodiments. For example, the functional block diagram of FIG. 2 is just an example, and may be different from an actual program module configuration. Further, the process order may be changed or may be performed in parallel as long as the process results are the same.

Figure 21:
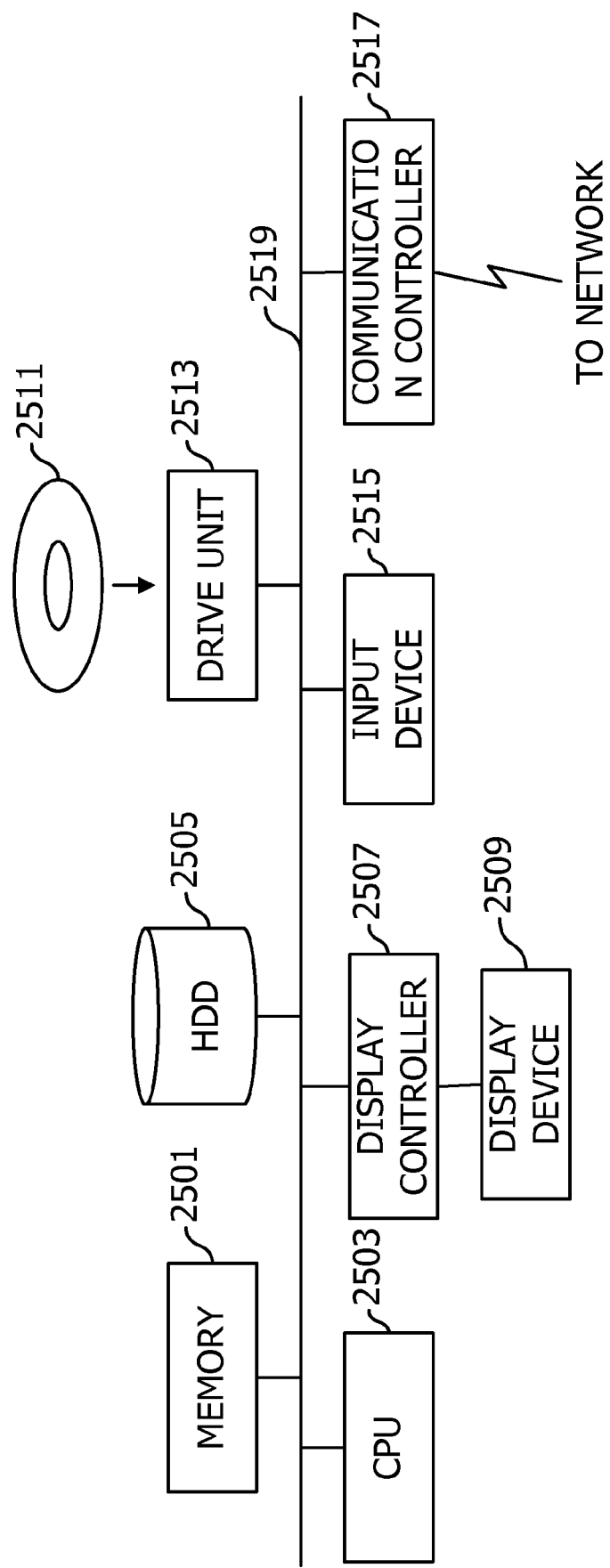
FIG. 21 is a functional block diagram of a computer.

Note that each of the band measuring device 1 and the measurement target device 3 is a computer device and as illustrated in FIG. 21, includes a memory 2501, a CPU 2503, a hard disk drive (HDD) 2505, a display controller 2507 connected to a display device 2509, a drive unit 2513 for a removable disk 2511, an input device 2515, a communication controller 2517 for connecting to a network, all of which are connected through a bus 2519. The operating system (OS) and application programs for executing the processes in accordance with the present embodiments are stored in the HDD 2505. The OS and the application programs are read from the HDD 2505 to the memory 2501 and executed by the CPU 2503. The CPU 2503 controls to instruct the display controller 2507, the communication controller 2517, and the drive unit 2513 to perform a necessary operation as needed. Moreover, in-process data is stored in the memory 2501, and if needed, stored in the HDD 2505. According to the embodiments of the present technique, the application programs for executing the aforementioned processes are stored in and distributed by a computer-readable removable disk 2511, and installed from the drive unit 2513 to the HDD 2505. In some cases, the application programs may be installed in the HDD 2505 through a network such as the Internet and the communication controller 2517. Such a computer device achieve the aforementioned various functions by controlling the aforementioned hardware such as the CPU 2503 and the memory 2501, the OS, and the necessary application programs so as to organically cooperate with each other.

According to the embodiment described above, the method can calculate a communication bandwidth available for uplink without adding a special function to the measurement target device.

The embodiment described above is a preferred embodiment. The present invention is not limited to this but various modifications can be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A non-transitory computer-readable recording medium recording a program for measuring a band available for transmitting data to a measurement target device connected via a network, wherein the program causes a computer to execute:
   transmitting a first request having a first data size and requesting the measurement target device to return a first response having a fixed size from the measurement target device via the network to the band measuring device as well as for starting a first time measurement;
   terminating the first time measurement upon receipt of the first response from the measurement target device, and for determining a first time from when the first request is transmitted to when the first response is received;
   transmitting a second request having a second data size and requesting the measurement target device to return a second response having the fixed size, to the measurement target device via the network as well as for starting a second time measurement, wherein a processing time for the first request by the measurement target device is substantially the same as a processing time for the second request by the measurement target device;
   terminating the second time measurement upon receipt of the second response from the measurement target device, and for determining a second time from when the second request is transmitted to when the second response is received; and
   calculating a first communication band available for transmitting data to the measurement target device by dividing the difference between the first data size and the second data size by the difference between the first time and the second time.

2. The non-transitory computer-readable recording medium according to claim 1, wherein at least one of the first data size and the second data size, whichever larger, is a size of fragmented data.

3. The non-transitory computer-readable recording medium according to claim 1, wherein each of the first and second requests is a UDP packet to an unused port, and each of the first and second responses is an unreachable response.

4. The non-transitory computer-readable recording medium according to claim 1, wherein a communication band available for transmitting data to a plurality of measurement target devices is to be measured, the requests are transmitted by multiplexing at a predetermined time difference to the plurality of measurement target devices.

5. The non-transitory computer-readable recording medium according to claim 1, wherein the program measures the available communication band at a predetermined cycle.

6. A non-transitory computer-readable recording medium recording a program for measuring a band available for transmitting data to a measurement target device connected via a network without adding a dedicated band measuring function to the measurement target device, wherein the program causes computer to execute:
   transmitting a first request having a first data size and requesting the measurement target device to return a first response having the first data size from the measurement target device via the network to the band measuring device as well as for starting a first time measurement;
   terminating the first time measurement upon receipt of the first response from the measurement target device, and for determining a first time from when the first request is transmitted to when the first response is received;

transmitting a second request having a second data size and requesting the measurement target device to return a second response having the second data size, to the measurement target device via the network as well as for starting a second time measurement;

terminating the second time measurement upon receipt of the second response from the measurement target device, and for determining a second time from when the second request is transmitted to when the second response is received; and calculating a communication band available for receiving data from the measurement target device, as an inverse number of a value obtained by subtracting an inverse number of a known communication band available for transmitting data to the measurement target device, from a value obtained by dividing the difference between the first time and the second time by the difference between the first data size and the second data size.

7. The non-transitory computer-readable recording medium according to claim 6, wherein the program causes the computer to further execute:

transmitting a third request having a third data size and requesting the measurement target device to return a third response having a fixed size from the measurement target device via the network to the band measuring device as well as for starting a third time measurement;

terminating the third time measurement upon receipt of the third response from the measurement target device, and for determining a third time from when the third request is transmitted to when the third response is received;

transmitting a fourth request having a fourth data size and requesting the measurement target device to return a fourth response having the fixed size, to the measurement target device via the network as well as for starting a fourth time measurement;

terminating the fourth time measurement upon receipt of the fourth response from the measurement target device, and for determining a fourth time from when the fourth request is transmitted to when the fourth response is received; and calculating a communication band available for transmitting data to the measurement target device by dividing the difference between the third data size and the fourth data size by the difference between the third time and the fourth time.

8. The non-transitory computer-readable recording medium according to claim 6, wherein each of the first and second requests is a Ping request packet, and each of the first and second responses is a Ping response packet.

9. A band measurement method for measuring a band available for transmitting data to a measurement target device connected via a network without adding a dedicated band measuring function to the measurement target device, the method being executed by a computer and comprising:

transmitting a first request having a first data size and requesting the measurement target device to return a first response having a fixed size from the measurement target device via the network to the band measuring device as well as for starting a first time measurement;

terminating the first time measurement upon receipt of the first response from the measurement target device, and for determining a first time from when the first request is transmitted to when the first response is received;

transmitting a second request having a second data size and requesting the measurement target device to return a second response having the fixed size, to the measurement target device via the network as well as for starting a second time measurement, wherein a processing time for the first request by the measurement target device is substantially the same as a processing time for the second request by the measurement target device;

terminating the second time measurement upon receipt of the second response from the measurement target device, and for determining a second time from when the second request is transmitted to when the second response is received; and calculating a first communication band available for transmitting data to the measurement target device by dividing the difference between the first data size and the second data size by the difference between the first time and the second time.

10. A band measuring method for measuring a band available for transmitting data to a measurement target device connected via a network without adding a dedicated band measuring function to the measurement target device, the method being executed by a computer and comprising:

transmitting a first request having a first data size and requesting the measurement target device to return a first response having the first data size from the measurement target device via the network to the band measuring device as well as for starting a first time measurement;

terminating the first time measurement upon receipt of the first response from the measurement target device, and for determining a first time from when the first request is transmitted to when the first response is received;

transmitting a second request having a second data size and requesting the measurement target device to return a second response having the second data size, to the measurement target device via the network as well as for starting a second time measurement, wherein a processing time for the first request by the measurement target device is substantially the same as a processing time for the second request by the measurement target device;

terminating the second time measurement upon receipt of the second response from the measurement target device, and for determining a second time from when the second request is transmitted to when the second response is received; and calculating a communication band available for receiving data from the measurement target device, as an inverse number of a value obtained by subtracting an inverse number of a known communication band available for transmitting data to the measurement target device, from a value obtained by dividing the difference between the first time and the second time by the difference between the first data size and the second data size.

* * * * *